(12) United States Patent
Ramamurthi et al.

(10) Patent No.: US 10,499,434 B2
(45) Date of Patent: Dec. 3, 2019

(54) MOBILE TERMINAL DEVICE AND METHOD FOR PROCESSING SIGNALS

(71) Applicant: Intel Corporation, Santa Clara, CA (US)

(72) Inventors: Vishwanath Ramamurthi, Sunnyvale, CA (US); Masoud Sajadieh, Fremont, CA (US); Nikita Degotinsky, Saint Petersburg (RU)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 14/865,067

(22) Filed: Sep. 25, 2015

(65) Prior Publication Data

US 2017/0094686 A1    Mar. 30, 2017

(51) Int. Cl.
*H04W 74/08*    (2009.01)
*H04W 72/04*    (2009.01)
*H04L 27/26*    (2006.01)

(52) U.S. Cl.
CPC ..... *H04W 74/0833* (2013.01); *H04L 27/2633* (2013.01); *H04W 72/0406* (2013.01); *H04L 27/2636* (2013.01)

(58) Field of Classification Search
None
See application file for complete search history.

(56) References Cited

U.S. PATENT DOCUMENTS

2007/0060180 A1*  3/2007  Muharemovic ....... H04J 3/0682
                                                455/509
2007/0076817 A1*  4/2007  Suh ....................... H04L 27/265
                                                375/303

(Continued)

FOREIGN PATENT DOCUMENTS

CN    101860395      5/2012
CN    103001905      3/2013

OTHER PUBLICATIONS

3rd Generation Partnership Project, "Technical Specification Group Radio Access Network; Evolved Universal Terrestrial Radio Access (E-UTRA); Physical Channels and Modulation (Release 8)" 3GPP TS 36.211 V8.7.0 (May 2009) May 2009 (Year: 2009).*

(Continued)

*Primary Examiner* — Robert M Morlan
(74) *Attorney, Agent, or Firm* — Viering, Jentschura & Partner mbB

(57) ABSTRACT

A mobile terminal device may include a radio processing circuit and a baseband processing circuit adapted to interact with the baseband processing circuit. The mobile terminal device may be configured to calculate a plurality of inverse frequency transforms with inputs of a plurality of samples of a frequency-domain signal sequence to generate a plurality of intermediate transforms, wherein each of the plurality of intermediate transforms are composed of a respective plurality of samples, combine the respective plurality of samples of each of the plurality of intermediate transforms to generate a time-domain representation of the frequency-domain signal sequence, generate a random access preamble with the time-domain representation of the frequency-domain signal sequence, and transmit the random access preamble.

24 Claims, 10 Drawing Sheets

(56) References Cited

U.S. PATENT DOCUMENTS

| | | | |
|---|---|---|---|
| 2007/0217329 A1* | 9/2007 | Abedi | H04L 27/2614 370/208 |
| 2010/0195479 A1 | 8/2010 | Lipka et al. | |
| 2011/0064069 A1* | 3/2011 | Lipka | H04L 5/0007 370/344 |
| 2011/0158330 A1 | 6/2011 | Huang et al. | |
| 2015/0319800 A1* | 11/2015 | Park | H04L 1/1812 370/329 |

OTHER PUBLICATIONS

He et al.: "An efficient implementation of PRACH generator in LTE UE transmitters", 7th International Wireless Communications and Mobile Computing Conference (IWCMC), Jul. 2011, pp. 2226-2230, IEEE, Istanbul.
Beyme et al.: "Efficient computation of DFT of Zadoff-Chu sequences", Electronics Letters, Apr. 23, 2009, 2 pages, vol. 45, Issue 9.
"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, 2015, pp. 48-58, Sophia Antipolis, France.
European Search Report based on Application No. 16185148.0 (7 pages) dated Feb. 6, 2017 (Reference Purpose Only).

* cited by examiner

MOBILE TERMINAL DEVICE AND METHOD FOR PROCESSING SIGNALS

TECHNICAL FIELD

Various embodiments relate generally to mobile terminal devices and methods for processing signals.

BACKGROUND

Mobile terminals may utilize random access procedures in order to establish a connection and/or synchronization with a mobile communication network. For example, mobile terminals may utilize random access procedures to establish a new network connection, during handover procedures, and/or to establish timing synchronization with a base station.

In a Long Term Evolution (LTE) context, a base station may specify a Physical Random Access Channel (PRACH) configuration that designates a set of preamble sequences and specific time-frequency resources allocated for the PRACH, where one or more PRACH opportunities occur during specific radio frames. One or more mobile terminals that seek to connect to the base station may select one of the preamble sequences and transmit the selected preamble sequence to the base station on the PRACH. The PRACH resources may be shared between one or more mobile terminals, and accordingly each PRACH occasion may contain preamble sequences transmitted by one or more mobile terminals. Each available preamble sequence may be orthogonal to the other available preamble sequences, and accordingly a base station may individually detect multiple mobile terminals when each mobile terminal utilizes a different preamble sequence.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
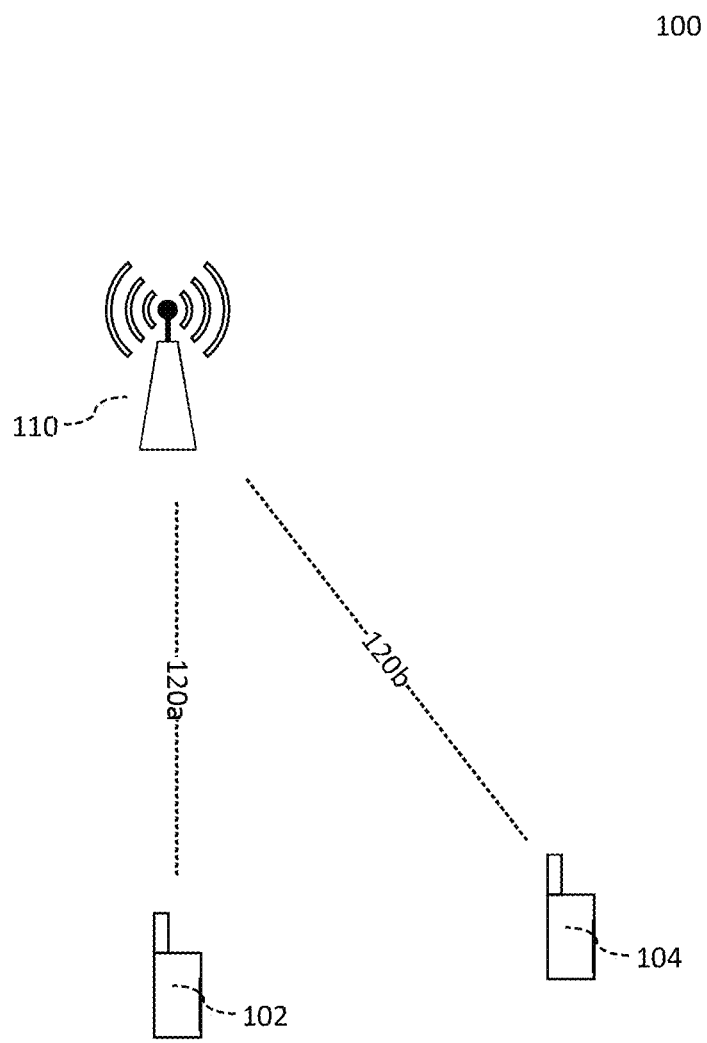
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry"

in the claims included herein, the use of "circuit" may be understood as collectively referring to two or more circuits.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the following description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source (e.g. through one or more secondary agents).

In a Long Term Evolution (LTE) network architecture as specified by the $3^{rd}$ Generation Partnership Project (3GPP), mobile terminals may utilize random access procedures during initial establishment of a network connection, during handover procedures, and/or to establish timing synchronization. During random access procedures, a mobile terminal may select an available random access preamble and transmit the selected random access preamble to a base station using specific time-frequency resources allocated to the Physical Random Access Channel (PRACH). The unique signal properties of random access preamble may allow the base station to uniquely detect multiple random access preambles received on the same PRACH resources.

According to Sections 5.7-5.8 of the 3GPP Technical Specification TS 36.211 "Physical channels and modulation" V12.5.0 (Release 12) of March 2015 ("3GPP TS 36.211 (Release 12)"), each available random access preamble may contain a preamble sequence and a cyclic prefix. As will be detailed, a base station may designate a set of available preamble sequences that are available for use in a random access preamble by mobile terminals seeking to establish a connection with the base station. Furthermore, a base station may designate a specific set of time-frequency resources for the PRACH, such as by identifying certain Physical Resource Blocks (PRB) of certain subframes allocated to the PRACH. A given radio frame may contain none, one, or more than one PRACH opportunities (contiguous time-frequency blocks mapped to the PRACH) dependent on the PRACH resources specified by the base station. Each PRACH opportunity may be shared between multiple mobile terminals, i.e. any one or more of the mobile terminals seeking to initiate random access procedures with the base station may utilize the same PRACH opportunity to transmit a random access preamble. As a result, a base station may concurrently receive multiple preamble sequences each respectively corresponding to a different mobile terminal for a single PRACH opportunity. In order to individually detect each preamble sequence, and consequently individually detect each mobile terminal, a base station may provide a set of available preamble sequences that are orthogonal to one another. Accordingly, each mobile terminal may select an available preamble sequence and transmit a random access preamble derived from the selected preamble sequence (i.e. by adding a cyclic prefix to obtain the random access preamble). Accordingly, if each mobile terminal using a given PRACH opportunity selects a different available preamble sequence a base station may receive multiple random access preambles that are orthogonal to one another, thus allowing the base station to individually detect each random access preamble. A base station may employ contention resolution in the event that any two or more mobile terminals select the same preamble sequence in order to ensure that all participating mobile terminals are detected. A base station may then establish a radio connection with each mobile terminal and/or establish timing synchronization with each mobile terminal upon detection thereof.

FIG. 1 shows mobile communication network 100, which includes base station 110, mobile terminal 102, and mobile terminal 104. Each of mobile terminals 102 and 104 may be served by a first cell of base station 110, where base station 110 may be composed of one or more cells (not explicitly shown denoted in FIG. 1). It is appreciated that the following description may focus on the first cell of base station 110, although the first cell could be any arbitrary cell. Mobile communication network 100 may be e.g. an LTE communication network. However, it is understood that the description provided herein is considered applicable to various other mobile communication technologies, both existing and not yet formulated, particularly in cases where such mobile communication technologies share similar features as disclosed regarding the following examples.

Figure 2:
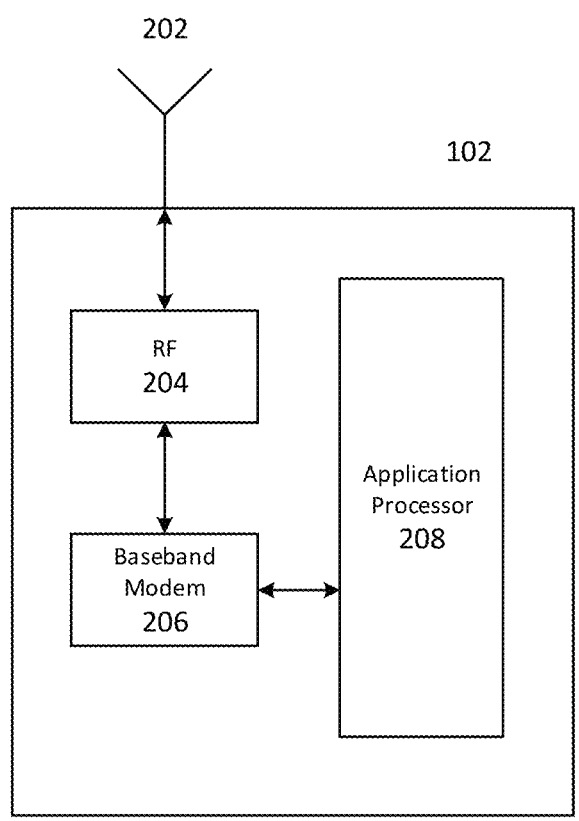
FIG. 2 shows an internal configuration of a mobile terminal.

FIG. 2 shows a block diagram illustrating an internal configuration of mobile terminal 102 according to an aspect of the disclosure. Mobile terminal 102 may be configured to effectively generate a random access preamble.

As illustrated in FIG. 2, mobile terminal 102 may include antenna 202, radio frequency (RF) transceiver 204, baseband modem 206, and application processor 208. As shown in FIG. 2, the aforementioned components of mobile terminal 102 may be implemented as separate components. However, it is appreciated that the architecture of mobile terminal 102 depicted in FIG. 2 is for purposes of explanation, and accordingly one or more of the aforementioned components of mobile terminal 102 may be integrated into a single equivalent component or divided into two separate components with collective equivalence. It is understood that mobile terminal 102 may have one or more additional components, such as additional hardware, software, or firmware elements. For example, mobile terminal 102 may further include various additional components including hardware, firmware, processors, microprocessors, memory, and other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 102, in particular, RF transceiver 204, baseband modem 206, and application processor 208 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 102 may be a mobile terminal device having a radio processing circuit (RF transceiver 204) and a baseband processing circuit (baseband modem 206) adapted to interact with the radio processing circuit. Mobile terminal 102 may be configured to provide each of a plurality of samples of a frequency-domain signal sequence as input to each of a plurality of inverse frequency transform computations, execute the plurality of inverse frequency transform computations to obtain a plurality of intermediate transforms, wherein each of the plurality of intermediate transforms are composed of a respective plurality of samples, combine the respective plurality of samples of each of the plurality of intermediate transforms to obtain a time-domain representation of the frequency-domain signal sequence, and generate a random access preamble with the time-domain representation of the frequency-domain signal sequence. Additionally and/or alternatively, mobile terminal 102 may be configured to identify a preamble frequency position in the frequency domain, execute a plurality of inverse frequency transform computations on each of a plurality of samples of a frequency-domain signal sequence to obtain a plurality of intermediate transforms, wherein each of the plurality of intermediate transforms are composed of a plurality of samples, apply a respective frequency shift to each sample of the plurality of samples of each of the plurality of intermediate transforms to generate a respective plurality of frequency-shifted samples for each of the plurality of intermediate transforms, wherein each respective frequency shift is dependent on the preamble frequency position, and combine the respective plurality of frequency-shifted samples of each of the plurality of intermediate transforms to generate a time-domain representation of the frequency-domain signal sequence.

In an abridged overview of the operation of mobile terminal 102, mobile terminal 102 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile terminal 102 may be determined by one or more Subscriber Identity Modules (SIM) included in mobile terminal 102 (not explicitly shown in FIG. 1). It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modern for WiFI reception and transmission. Alternatively, one or more components of mobile terminal 102 may be shared between different wireless access protocols, such as e.g. by sharing antenna 202 between multiple different wireless access protocols. In an exemplary aspect of disclosure, RF transceiver 204 and/or baseband modem 206 may be operate according to multiple mobile communication access protocols (i.e. "multi-mode"), and thus may be configured to support one or more of LTE, UMTS, and/or GSM access protocols. Alternatively, one or both of RF transceiver 204 and baseband modem 206 may be divided into two separate components, where each component is dedicated to single radio access technology.

Further according to the abridged overview of operation of mobile terminal 102, RF transceiver 204 may receive radio frequency wireless signals via antenna 202, which may be implemented as e.g. a single antenna or an antenna array composed of multiple antennas. RF transceiver 204 may include various reception circuitry elements, which may include e.g. analog circuitry, configured to process externally received signals, such as mixing circuitry to convert externally received RF signals to baseband and/or intermediate frequencies. RF transceiver 204 may also include amplification circuitry to amplify externally received signals, such as power amplifiers (PAs) and/or Low Noise Amplifiers (LNAs), although it is appreciated that such components may also be implemented separately. RF transceiver 204 may additionally include various transmission circuitry elements configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver 204 may provide such signals to antenna 202 for wireless transmission. Further references herein to reception and/or transmission of wireless signals by mobile terminal 102 may thus be understood as an interaction between antenna 202, RF transceiver 204, and baseband modem 206 as detailed above. Although not explicitly depicted in FIG. 2, RF transceiver 204 may be additionally be connected to application processor 208.

Figure 3:
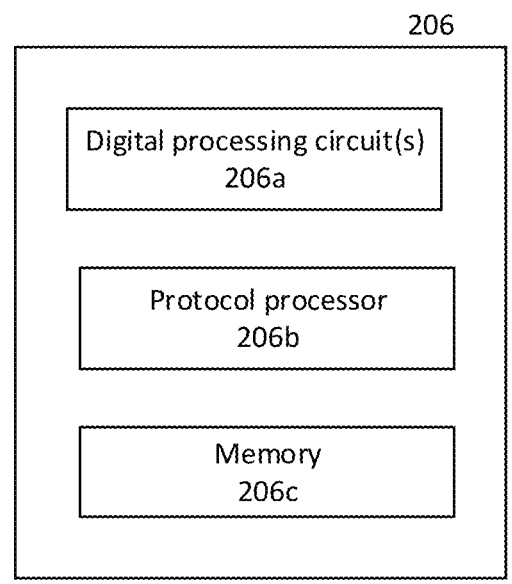
FIG. 3 shows an internal configuration of a baseband modem.

FIG. 3 shows a block diagram illustrating an internal configuration of baseband modem 206 according to an aspect of the disclosure. Baseband modem 206 may include digital processing circuit(s) 206a (i.e. one or more digital processing circuits), protocol processor 206b, and baseband memory 206c. Although not explicitly shown in FIG. 3, baseband modem 206 may contain one or more additional components, including e.g. one or more analog processing circuits.

Digital processing circuit(s) 206a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 206a may include hardware, software, or a combination of hardware and software. Specifically, digital processing circuit(s) 206a of baseband modem 206 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 206 may be detailed herein substantially in terms of functional operation in recognition that a person of skill in the art may readily appreciate the various possible structural realizations of baseband modem 206 using digital processing circuitry that will provide the desired functionality.

As will be detailed, digital processing circuit(s) 206a may include at least one parallel processing circuit, such as e.g. a GPU or parallel ASIC system, in order to perform parallel processing as part of an Inverse Discrete Fourier Transform (IDFT) or an Inverse Fast Fourier Transform (IFFT) operation.

Baseband modem 206 be configured to operate one or more protocol stacks, such as a GSM protocol stack, a UMTS protocol stack, an LTE protocol stack, etc. Baseband modem 206 may be "multimode" and may thus be configured to operate in accordance with multiple RATs by executing multiple protocol stack instances. Accordingly, protocol processor 206b may be provided in order to execute one or more protocol stack instances. Protocol processor 206b may be e.g. a processor, microprocessor, controller, microcontroller, Central Processing Unit (CPU) etc. For example, protocol processor 206b may be a microcontroller, and accordingly may include a processor core, memory, and programmable input/output peripherals. Protocol processor 206b may be configured to execute the one or more protocol stack instances by executing program code corresponding to the one or more protocol stack instances, such as program code stored in an internal memory of protocol processor 206b (e.g. for protocol processor 206b implemented as a microcontroller) or in baseband memory 206c. By executing the one or more protocol stack instances, protocol processor 206b may act as a controller for operations of baseband modem 206, and may accordingly directly and/or indirectly control operations of digital processing circuit(s) 206a, baseband memory 206c, antenna 202, RF transceiver 204, other audio/video components (e.g. audio transducers including microphone(s) and/or speaker(s)), application processor 108, etc.

Baseband memory 206c may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 206c may be configured to store software elements, which may be retrieved and executed using a processor component of digital processing circuit(s) 206a. Although depicted as a single component in FIG. 2, baseband memory 206c may be implemented as one or more separate components in baseband modem 206. Baseband memory 206c may also be partially or fully integrated with digital processing circuit(s) 206a.

As will be detailed, baseband modem 206 may include one or more digital processing circuits (digital processing circuit(s) 206a and/or protocol processor 206b) and a memory (baseband memory 206c). Baseband modem 206 may be configured to provide each of a plurality of samples of a frequency-domain signal sequence as input to each of a plurality of inverse frequency transform computations, execute the plurality of inverse frequency transform computations to obtain a plurality of intermediate transforms, wherein each of the plurality of intermediate transforms are composed of a respective plurality of samples, combine the respective plurality of samples of each of the plurality of intermediate transforms to obtain a time-domain representation of the frequency-domain signal sequence, and generate a random access preamble with the time-domain representation of the frequency-domain signal sequence.

Application processor 208 may be implemented as a Central Processing Unit (CPU), and may function as a controller for mobile terminal 102. Application processor 208 may be configured to execute various applications and/or programs of mobile terminal 102, such as e.g. applications corresponding to program code stored in a memory component of mobile terminal 102 (not explicitly shown in FIG. 2). Application processor 208 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc.

Although baseband modem 206 and application processor 208 are depicted separately in FIG. 2, it is appreciated that this exemplary illustration is not limiting in nature. Accordingly, it is understood that baseband modem 206 and application processor 208 may be implemented separately, implemented together (i.e. as an integrated unit), or partially implemented together.

In an exemplary scenario, mobile terminal 102 may seek to initiate random access procedures with base station 110. For example, mobile terminal 102 may seek to transition from an idle radio control state, i.e. where mobile terminal 102 is not allocated wireless resources to perform scheduled uplink transmissions (e.g. on the Physical Uplink Shared Channel (PUSCH) and/or the Physical Uplink Control Channel (PUCCH)), to a connected radio control state. Alternatively, mobile terminal 102 may have recently initiated a handover procedure, such as by undergoing a handover procedure from e.g. another base station (not explicitly shown in FIG. 1) to base station 110. Alternatively, mobile terminal 102 may have recently lost timing synchronization with base station 102.

Accordingly, mobile terminal 102 may seek to either establish a radio connection with base station 110 (e.g. enter a connected radio control state and obtain uplink resources to perform scheduled uplink transmissions on the PUCCH and/or PUSCH) following a duration of time in an idle radio connection state, to establish a radio connection with base station 110 after a handover, and/or to establish timing synchronization with base station 110, such as by allowing base station 110 to determine a timing advance for mobile terminal 102. In accordance with an LTE context, mobile terminal 102 may initiate random access procedures with base station 110.

Specifically, mobile terminal 102 may determine the PRACH configuration specified by base station 110, such as by receiving a System Information Block Type 2 (SIB2) message. Mobile terminal 102 may read the prach-Configuration (PRACH configuration) parameters from the SIB2 message, including rootSequenceIndex, prach-ConfigurationIndex, highSpeedFlag, zeroCorrelationZoneConfig, and prach-FrequencyOffset. As will be detailed, mobile terminal 102 may identify PRACH time resources with prach-ConfigurationIndex, PRACH frequency resources with prach-FrequencyOffset, and the set of available preamble sequences with rootSequenceIndex, highSpeedFlag, and zeroCorrelationZoneConfig.

Figure 4:
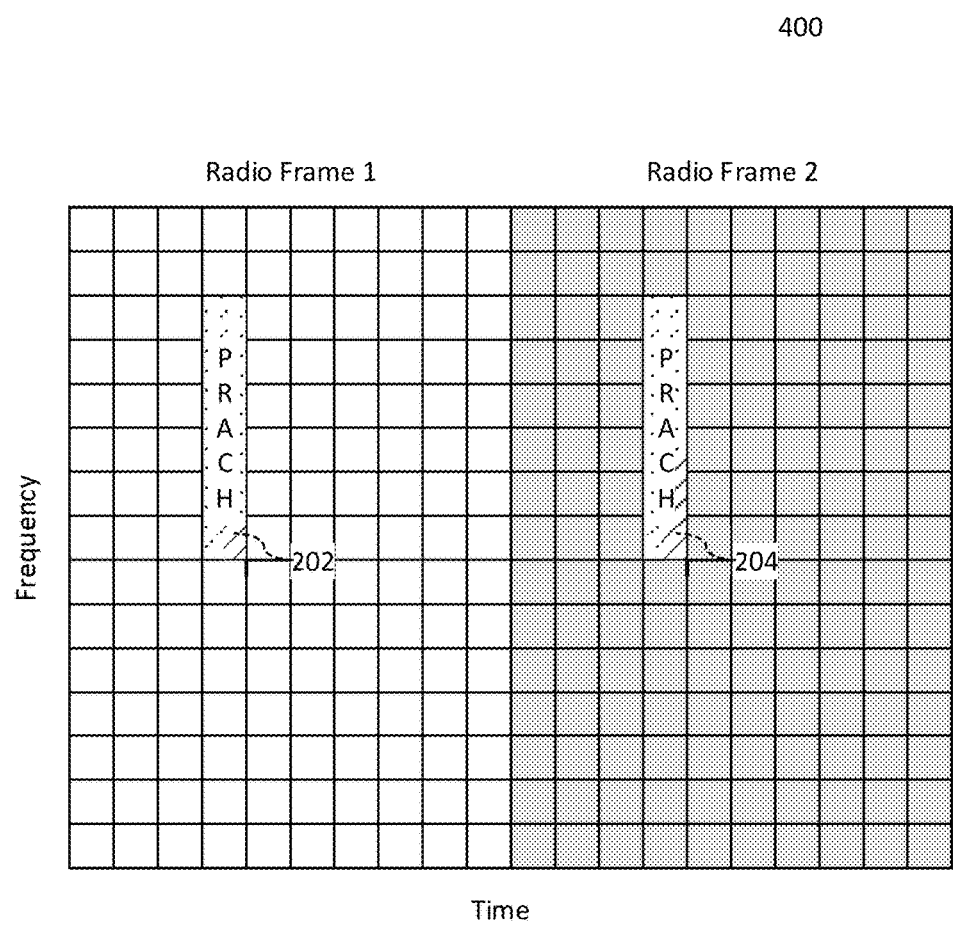
FIG. 4 shows an exemplary resource grid containing multiple PRACH opportunities.

FIG. 4 shows resource grid 400, where each unit of the horizontal time axis corresponds to a subframe and each unit of the vertical frequency axis corresponds to the frequency band allocated to a resource block. In accordance with an LTE configuration using Frequency Division Duplexing (FDD), each subframe may be 1 ms in duration and may be divided into two 0.5 ms slots. Resource grid 400 may contain two total radio frames each composed of 10 subframes each.

Resource grid 400 may correspond to an LTE system with a 3 MHz system bandwidth, thus utilizing a total of 15 resource blocks (i.e. number of uplink resource blocks $N_{RB}^{UL}=15$) where each resource block spans 180 kHz in the frequency domain. As shown in FIG. 4, resource grid 400 may include PRACH opportunities 402 and 404, which may each be mapped to specific resource blocks and in specific subframes of Radio Frame 1 and Radio Frame 2

In a synoptic overview of random access procedures with respect to a mobile terminal in FDD mode, mobile terminal 102 may receive an SIB2 message broadcasted by base station 110 and read the prach-Configuration parameters rootSequenceIndex, prach-ConfigurationIndex, highSpeedFlag, zeroCorrelationZoneConfig, and prach-FrequencyOffset in order to determine the PRACH configuration for base station 110. Specifically, mobile terminal 102 may utilize the prach-Configuration parameters in order to identify the specific time-frequency resources allocated to the PRACH and to identify the set of preamble sequences available for use in random access procedures with base station 110. It is appreciated that while the synoptic overview may focus on an FDD context, it is understood that such is for purposes of explanation and that the preamble sequence generation techniques detailed herein may similarly be applied in a TDD context. Furthermore, it is appreciated that mobile terminal 110 may consider contention and non-contention based procedures in the selection of a preamble sequence, such as by identifying reserved preamble sequences that are not available for selection or by selecting a reserved preamble sequence if specifically assigned to mobile terminal 102.

In accordance with an LTE configuration as specified in "3GPP TS 36.211 (Release 12)" (referenced above), each cell may support 64 different preamble sequences. For purposes of explanation, the following description may refer to a first cell of base station 110 which mobile terminal 102 is seeking to establish a connection with. It is appreciated that base station 110 may additionally serve one or more additional cells according to an arbitrary sectorization.

Accordingly, base station 110 may broadcast SIB2 containing prach-Configuration parameters that specify the set of 64 preamble sequences available for use with base station 110. Mobile terminal 102 may identify the set of 64 available preamble sequences and select one of the preamble sequences to transmit during a given PRACH opportunity (i.e. during a specific time window and on a specific frequency band allocated for the PRACH).

Figure 5:
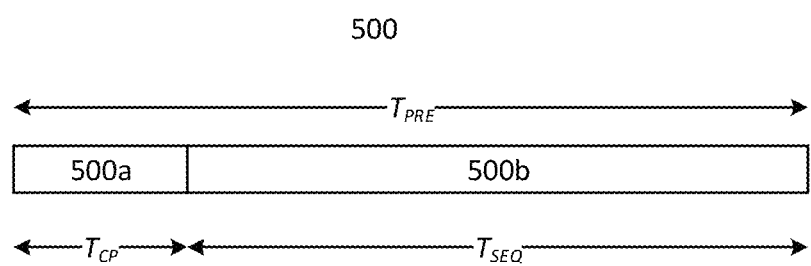
FIG. 5 shows a timing diagram illustrating a PRACH preamble.

FIG. 5 shows random access preamble 500, which may be composed of cyclic prefix 500a of duration $T_{CP}$ and preamble sequence 500b of duration $T_{SEQ}$. Cyclic prefix 500a may be applied in order to mitigate interference from the previous subframe occurring before a given PRACH opportunity, and may be a copied section from the end of preamble sequence 500b that is appended to the beginning of preamble sequence 500b as shown in FIG. 5. prach-ConfigurationIndex may specify the durations $T_{CP}$ and $T_{SEQ}$ by virtue of the preamble format (from 0-3 for an FDD system) mapped to each possible prach-ConfigurationIndex. Additionally, preamble sequence 500b may be repeated depending on the preamble format specified by prach-ConfigurationIndex. Dependent on the respective durations of $T_{CP}$ and $T_{SEQ}$ and any necessary repetitions of preamble sequence 500b, the total random access preamble length $T_{PRE}$ may range from 0.9 ms to 2.28 ms in duration, where each PRACH opportunity may be 1, 2, or 3 ms in duration (i.e. 1, 2, or 3 subframes). The leftover time between the end of the random access preamble and the end of the next subframe may thus be allocated as a guard time interval (not explicitly depicted in FIG. 5), which may be utilized in order to ensure that cell-edge mobile terminals transmit random access preambles that can be received by a base station within the specified PRACH opportunity.

In addition to determining the cyclic prefix and preamble sequence durations $T_{CP}$ and $T_{SEQ}$, mobile terminal 102 may use prach-ConfigurationIndex to identify the subframes within specified radio frames that the PRACH for base station 110 is mapped to. Specifically, mobile terminal 102 may determine which radio frames contain PRACH opportunities (e.g. only radio frames with even System Frame Numbers (SFN) or all radio frames) and which subframes of these radio frames contain the PRACH opportunities (e.g. any one or more of subframe 0-9 in a given radio frame). Each radio frame may have none, one, or more than one PRACH opportunity dependent on the PRACH configuration specified by base station 110.

Accordingly, mobile terminal 102 may identify the preamble format ($T_{CP}$, $T_{SEQ}$, and any repetitions) in addition to the time resources (on a subframe level) allocated for PRACH opportunities by reading the prach-ConfigurationIndex specified in an SIB2 message from base station 110.

In addition to identifying the time resources allocated for the PRACH, mobile terminal 102 may also need to identify the frequency resources allocated for the PRACH. In accordance with an LTE context as specified by "3GPP TS 36.211 (Release 12)", each PRACH opportunity may have a bandwidth of six physical resource blocks in the frequency domain. Mobile terminal 102 may identify the frequency resources (on a physical resource block level) allocated for PRACH opportunities by reading the prach-FrequencyOffset parameter in an SIB2 message received from base station 110. For preamble formats 0-3, the prach-FrequencyOffset parameter $n_{PRB_{offset}}^{RB}$ may specify the first physical resource block $n_{PRB}^{RA}$ (by physical resource block number) allocated to a PRACH opportunity as $n_{PRB}^{RA} = n_{PRB_{offset}}^{RA}$ where $0 \le n_{PRB_{offset}}^{RA} \le N_{RB}^{UL} - 6$ (where $N_{RB}^{UL}$ is the total number of uplink resource blocks as previously defined).

Accordingly, resource grid 400 may correspond to an FDD system with a 3 MHz system bandwidth ($N_{RB}^{UL}=15$) with a prach-ConfigurationIndex of 4, prach-FrequencyOffset of 7 ($n_{PRB_{offset}}^{RA} = n_{PRB}^{RA} = 7$), and a normal cyclic prefix length. In the exemplary scenario of FIG. 4, each PRACH opportunity 402 and 404 may therefore be 1 ms in duration (i.e. a single subframe) with $T_{CP}=0.1$ ms and $T_{SEQ}=0.8$ ms (resulting in a guard time interval of 0.1 ms) and may occur in the 4$^{th}$ subframe (i.e. subframe #3 out of subframes #0-#9) of every radio frame in accordance with a prach-ConfigurationIndex of 4. Additionally, each PRACH opportunity 402 and 404 may be mapped to the 8$^{th}$-13$^{th}$ physical resource blocks (i.e. moving up the frequency axis) in accordance with $n_{PRB_{offset}}^{RA}=7$. It is appreciated that resource grid 400 illustrates an exemplary PRACH configuration and that the following descriptions equivalently apply to any potential PRACH configuration.

Mobile terminal 102 may therefore identify the time and frequency resources allocated for each PRACH opportunity using prach-ConfigurationIndex and prach-FrequencyOffset, which in the exemplary scenario of FIG. 4 may each span one subframe during each radio frame as shown regarding PRACH opportunities 402 and 404. Accordingly, mobile terminal 102 may identify the available PRACH resources for use in random access procedures with base station 110.

As previously indicated, mobile terminal 102 may additionally identify the set of preamble sequences specified by base station 110, which may be e.g. 64 total preamble sequences in an LTE context. As will be detailed, each of the 64 total preamble sequences may respectively correspond to a physical root-cyclic shift pair, where each of the 64 total preamble sequences has a unique physical root and/or cyclic shift than the other preamble sequences. Mobile terminal 102 may utilize the rootSequenceIndex, highSpeedFlag, and zeroCorrelationZoneConfig parameters specified by base station 110 in order to identify the set physical root-cyclic shift pair for each of the 64 available preamble sequences. It is appreciated that one or more of the 64 total preamble sequences may additionally be reserved for non-contention random access procedures, which mobile terminal 102 may additionally be aware of via prior control signaling with base station 102.

As previously indicated, each of the available preamble sequences may be respectively orthogonal in order to allow base station 110 to individually detect each mobile terminal that has selected a distinct preamble sequence (e.g. a preamble sequence that has not also been selected by another mobile terminals for the same PRACH opportunity). Accordingly, as specified by "3GPP TS 36.211 (Release 12)", Zadoff-Chu sequences may be utilized to generate each of the possible preamble sequences due to the unique autocorrelation properties exhibited by such sequences. Specifically, cyclically shifted versions of the same Zadoff-Chu sequence (i.e. using the same root) are orthogonal to each other, thereby resulting in a perfect zero autocorrelation property.

Accordingly, each available preamble sequence may be derived from a time-domain Zadoff-Chu sequence with physical root u and predefined total length of $N_{ZC}$ that is cyclically shifted by cyclic shift $C_v$, where $N_{ZC}$ is either $N_{ZC}=839$ for preamble formats 0-3 (as indicated by prach-ConfigurationIndex) or $N_{ZC}=139$ for preamble format 4. Each preamble sequence may be uniquely assigned a physical root u and/or cyclic shift $C_v$ relative to the other available preamble sequences. As will be detailed, a given preamble sequence derived from root u and cyclic shift $C_v$ may be generated by computing an $N_{ZC}$ point Discrete Fourier Transform (DFT) of the $N_{ZC}$ length u Zadoff-Chu sequence with cyclic shift $C_v$, mapping the $N_{ZC}$ samples of the frequency domain root Zadoff-Chu sequence onto $N_{ZC}$ subcarriers, and computing an Inverse Discrete Fourier Transform (IDFT) in order to obtain a resulting time-domain preamble sequence. Cyclic prefix insertion and sequence repetition (if needed) may then be performed in order to generate the baseband random access preamble.

Base station 102 may indicate the physical root u and cyclic shift $C_v$ for each of the available preamble sequences in the with rootSequenceIndex, highSpeedFlag, and zero-CorrelationZoneConfig parameters. By identifying the physical root u and cyclic shift $C_v$ of each available preamble sequence, mobile terminal 102 may identify the set of available preamble sequences. In the exemplary scenario of FIG. 1, mobile terminal 102 may select a preamble sequence at random from the set of available preamble sequences, which may include considering preamble sequences of the set of available preamble sequences that are reserved for non-contention random access procedures. Upon selection of a preamble sequence, mobile terminal 102 may utilize the physical root u and cyclic shift $C_v$ to generate the preamble sequence in time, e.g. as shown in FIG. 5. Mobile terminal 102 may then append a cyclic prefix to the preamble sequence by copying an end section of the preamble sequence and appending the copied section to the beginning of the preamble sequence to obtain the baseband random access preamble. Mobile terminal 102 may then modulate the baseband random access preamble onto a radio frequency (RF) carrier and wirelessly transmit the resulting radio frequency random access preamble during a PRACH opportunity, thus initiating random access procedures.

The time-domain baseband random access preamble s(t) (in the analog domain) is defined as follows:

$$s(t) = \beta_{PRACH} \sum_{k=0}^{N_{ZC}-1} \sum_{n=0}^{N_{ZC}-1} x_{u,v}(n) \cdot e^{j2\pi(k+\varphi+K(k_0+\frac{1}{2}))\Delta f_{RA}(t-T_{CP})}, \quad (1)$$

where:

$K = \Delta f_{RA}/\Delta f$ $k_0 = n_{PRB}^{RA} N_{sc}^{RB} - N_{RB}^{UL} N_{sc}^{RB}/2$ and:

$\beta_{PRACH}$—PRACH amplitude scaling factor
$N_{ZC}$—preamble sequence length
$x_{u,v}(n)$—preamble sequence with $u^{th}$ root Zadoff-Chu sequence and cyclic shift $C_v$
$\Delta f_{RA}$—PRACH subcarrier spacing
$\Delta f$—uplink subcarrier spacing
$n_{PRB}^{RA}$—given by prach-FrequencyOffset $n_{PRB_{offset}}^{RA}$
$N_{sc}^{RB}$—number of subcarriers per resource block
$N_{RB}^{UL}$—number of uplink resource blocks
$\varphi$—fixed offset determining the frequency-domain location of the random access preamble within the physical resource blocks.

As previously indicated, each of the available preamble sequences specified by base station 110 may be uniquely determined with a root u and cyclic shift $C_v$, where the root and cyclic shift of each of the available preamble sequences is indicated by the rootSequenceIndex, highSpeedFlag, and zero CorrelationZoneConfig parameters. Accordingly, mobile terminal 102 may select a root u and cyclic shift $C_v$ to generate the cyclically-shifted root Zadoff-Chu sequence $x_{u,v}(n)$ for the random access preamble, which may be performed by baseband modem 206. The procedure may be summarized as follows:

a. Select root u
b. Compute cyclic shift $C_v$
c. Generate $N_{ZC}$-length cyclically-shifted root Zadoff-Chu sequence $x_{u,v}(n)$
d. Compute $N_{ZC}$-point Discrete Fourier Transform (DFT) of $x_{u,v}(n)$ to obtain $X_{u,v}(k)$
e. Map $X_{u,v}(k)$ to $N_{ZC}$ subcarriers in the frequency domain
f. Compute $N_{DFT}^{RA}$-point Inverse Discrete Fourier Transform (IDFT) of $X_{u,v}(k)$ to obtain $s_{u,v}(m)$, where $0 \leq m \leq N_{DFT}^{RA} - 1$
g. Perform sequence repetition of $s_{u,v}(m)$ (as needed dependent on preamble format) to obtain $\check{s}(m)$
h. Insert cyclic prefix to $\check{s}(m)$ to obtain time-domain baseband random access preamble $\check{s}(m)$
i. Shift $\check{s}(m)$ in frequency to proper location within PRACH-allocated physical resource blocks to obtain s(m)

Accordingly, baseband modem 206 may obtain digital time-domain baseband random access preamble s(m), which may be provided to RF transceiver 204 for subsequent radio frequency transmission to base station 110 during a PRACH opportunity. As denoted in FIG. 4, baseband modem 206 may first provide s(m) to a digital-to-analog converter (DAC) to convert s(m) into analog time-domain baseband random access preamble s(t) (as expressed in Equation 1). The DAC may be included as a component of baseband modem 206. Alternatively the DAC may be included as a component of RF transceiver 204 or as a separate intermediate component between baseband modem 206 and RF transceiver 204.

The preamble sequence generation process detailed above may be computationally intensive, as the sequence of signal processing operations needed in order to obtain the full time-domain baseband random access preamble may be complex. Accordingly, improvements to the random access preamble generation process may reduce processing power requirements and allow for more efficient computation of random access preambles by baseband modem 206.

In particular, computation of cyclic shift $C_v$ for high-speed situations (i.e. highSpeedFlag=true) may require calculation of a modulo inverse mod $N_{ZC}$, which may require up to $N_{ZC}-1$ computational iterations under a brute force approach.

Additionally, calculation of the $N_{ZC}$-point DFT of $x_{u,v}(n)$ in order to obtain $X_{u,v}(k)$ may involve a two-part procedure in order to first calculate the cyclically-shifted root Zadoff-Chu Sequence $x_{u,v}(n)$ and subsequently calculate the $N_{ZC}$-point DFT of $x_{u,v}(n)$.

Additionally, calculation of the $N_{DFT}^{RA}$-point IDFT of $X_{u,v}(k)$ to obtain $s_{u,v}(m)$ may potentially require an IDFT calculation of up to 24576 points (i.e. $N_{DFT}^{RA}=24576$), which may be computationally demanding to practically realize at a mobile terminal.

Accordingly, mobile terminal 102 may implement an enhanced random access preamble generation procedure that applies efficient cyclic shift computation of $C_v$, direct DFT calculation of $X_{u,v}(k)$ from u and $C_v$, and parallel IDFT computation of $s_{u,v}(m)$. Mobile terminal 102 may also apply time-domain frequency shifting during parallel IDFT computation of $s_{u,v}(m)$. Mobile terminal 102 may therefore reduce the processing demands on baseband modem 206 for generating the random access procedure.

Enhanced Random Access Preamble Generation

Figure 6:
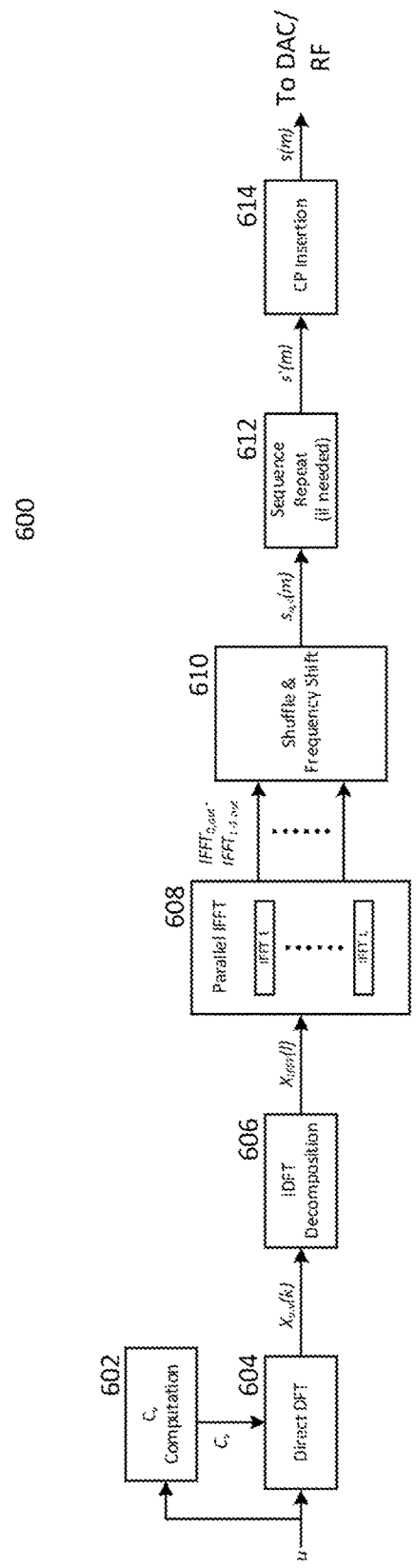
FIG. 6 shows a block diagram illustrating an efficient PRACH preamble generation procedure.

FIG. 6 shows block diagram 600 illustrating the enhanced random access preamble generation procedure, which may be executed at baseband modem 206 of mobile terminal 102. As will be detailed, mobile terminal 102 may apply efficient cyclic shift computation of $C_v$, direct (i.e. single part) DFT calculation of $X_{u,v}(k)$, and parallel IDFT computation of $s_{u,v}(n)$ as part of the enhanced random access preamble generation procedure. Mobile terminal 102 may also apply time-domain frequency shifting during parallel IDFT computation of $s_{u,v}(m)$. Baseband modem 206 may utilize the enhanced random access preamble generation to produce time-domain baseband random access preamble s(m) (i.e. the digital representation of s(t) in Equation 1), which may be provided to RF transceiver 206 for radio frequency transmission to base station 110 during a PRACH opportunity. Referring to baseband modem 206 as shown in FIG. 3, protocol processor 206b may control digital processing circuit(s) 206b and baseband memory 206c in order to execute the enhanced random access preamble generation procedure shown in FIG. 6.

Mobile terminal 102 may select an available physical root u-cyclic shift $C_v$ pair (i.e. non-reserved for non-contention random access procedures) according to the PRACH configuration specified by base station 110, thus identifying the $C_v$-shifted root u Zadoff-Chu sequence $x_{u,v}(n)$ to be generated for use in the random access preamble. Mobile terminal 102 may e.g. select the physical root u-cyclic shift $C_v$ pair at random from the permitted physical root-cyclic shift pairs each respectively corresponding to the available preamble sequences indicated by base station 110.

Mobile terminal 102 may apply the enhanced random access preamble generation procedure as follows:
- 602: Calculate $C_v$ using efficient cyclic shift computation
- 604: Calculate the DFT $X_{u,v}(k)$ of cyclically-shifted root Zadoff-Chu sequence $x_{u,v}(n)$ directly from u and $C_v$
- 606: Zero-pad $X_{u,v}(k)$ to generate $X_{IFFT}(l)$ and prepare for parallel IFFT in 608
- 608: Perform parallel IFFT using L IFFT processes on $X_{IFFT}(l)$ to obtain IFFT calculation outputs $IFFT_{g,out}$ for $0 \leq g \leq L-1$
- 610: Shuffle and merge output of parallel IFFT 608 and shift in frequency domain to construct $s_{u,v}(m)$ corresponding to $x_{u,v}(n)$
  (Optional): Perform frequency shift as part of shuffle and merge
- 612: Sequence repeat on $s_{u,v}(m)$ to obtain s'(m) (if needed)
- 614: Insert cyclic prefix to s'(m) to obtain s(m)

Accordingly, baseband modem 206 may generate time-domain baseband random access preamble s(m), which may be converted the analog domain as s(t) by a DAC and provided to RF transceiver 204. RF transceiver 204 may then modulate and transmit s(t) to base station 110 during a PRACH opportunity to initiate random access procedures.

Efficient Cyclic Shift Computation

Baseband modem 206 may calculate $C_v$ in 602. As will be detailed, baseband modem 206 may need to utilize different computations to compute $C_v$ in different scenarios.

As indicated above, each preamble sequence may be a cyclically-shifted root Zadoff-Chu sequence, where each of the available preamble sequences is characterized by a physical root u-cyclic shift $C_v$ pair. Each of the available preamble sequences may be uniquely assigned a physical root u and/or cyclic shift $C_v$, i.e. each of the available preamble sequences may differ by one or both physical root u or cyclic shift $C_v$. The set of available preamble sequences may be selected, e.g. by higher layers, to ensure that the available preamble sequences are respectively orthogonal to one another. Additionally, the relative spacing between cyclic shifts $C_v$ of preamble sequences having the same physical root u may be selected by higher layers based on mobile speed and cell coverage area in order to ensure correct identification of each preamble sequence.

According to "3GPP TS 36.211 (Release 12)", the $u^{th}$ root Zadoff-Chu sequence $x_u(n)$ and may be given as follows:

$$x_u(n) = e^{-\frac{j\pi u n(n+1)}{N_{ZC}}}, \quad (2)$$

where $0 \leq n \leq N_{ZC}-1$.

Similarly, the $u^{th}$ root Zadoff-Chu sequence with an applied cyclic shift $C_v$, $x_{u,v}(n)$, may be given as follows:

$$x_{u,v}(n) = x_u((n+C_v) \bmod N_{ZC}) \quad (3).$$

As previously indicated, each cell may provide 64 different available preamble sequences in an LTE context as specified by 3GPP. Mobile terminal 102 may identify the physical root-cyclic shift pair for each of the 64 available preamble sequences for the first cell of base station 110 using the rootSequenceIndex, highSpeedFlag, and zeroCorrelationZoneConfig specified by base station 110 in SIB2.

rootSequenceIndex may specify a logical root $\hat{u}_0$, where each possible logical root $\hat{u}$ refers to a physical root u. The logical-physical root correspondence may be predefined by higher layers, and accordingly mobile terminal 102 may identify the physical root $u_0$ corresponding to logical root $\hat{u}_0$ using the predefined logical-physical root mapping.

The zeroCorrelationZoneConfig parameter may specify the number of preamble sequences that can be generated from the root u Zadoff-Chu sequence identified by rootSequenceIndex, i.e. the number of preamble sequences that can be generated by shifting the root u Zadoff-Chu sequence by different cyclic shifts $C_v$. zeroCorrelationZoneConfig may range from 0-15, where each zeroCorrelationZoneConfig index corresponds to a zero correlation zone value $N_{CS}$. High values for $N_{CS}$ may yield a small number of widely spaced cyclic shifts $C_v$ per root u Zadoff-Chu sequence while low values for $N_{CS}$ may yield a high number of closely spaced cyclic shifts $C_v$ per root u Zadoff-Chu sequence.

The value of $N_{CS}$ may be selected by higher layers depending on the coverage area of the first cell of base station 110. As one or more of the set of available preamble sequences may be generated by performing varying cyclic shifts of the same root Zadoff-Chu sequence, there may exist scenarios in which base station 110 may mistakenly identify a preamble sequence with a first cyclic shift from a geographically distant mobile terminal as a preamble sequence with a second slightly different cyclic shift from a geographically proximate mobile terminal. Accordingly, if base station 110 has a large coverage area, from a preamble sequence detection perspective base station 110 may prefer to have only a few widely-spaced (i.e. widely spaced from zero to $N_{ZC-1}$) cyclic shifts available for each root Zadoff-Chu sequence. Alternatively, if base station 110 has a small coverage area, base station 110 may allow for greater quantities of cyclic shifts (i.e. with denser distribution from zero to $N_{ZC}-1$) per root Zadoff-Chu sequence as there may be less risk of mistaken preamble sequence identification due to limited propagation distances in the smaller coverage area.

The highSpeedFlag parameter may additionally affect the number of cyclic shifts available for each root Zadoff-Chu sequence. Base station 110 may set highSpeedFlag=true if the coverage area of the first cell contains many fast-moving mobile terminals. Due to the effects of Doppler shift, base station 110 may risk mistakenly identifying the preamble sequences of high speed mobile terminals if the permitted cyclic shifts are not spaced far enough apart. Accordingly, base station 110 may limit the number of cyclic shifts available for each root Zadoff-Chu sequence in true highSpeedFlag scenarios, thus resulting in fewer, widely spaced cyclic shifts per root Zadoff-Chu sequences. Such true highSpeedFlag scenarios may result in "restricted sets", i.e. limited quantities of cyclic shifts per root Zadoff-Chu sequence, while false highSpeedFlag scenarios may conversely result in "un-restricted sets".

Accordingly, dependent on the $N_{CS}$ value specified by zeroCorrelationZoneConfig and the highSpeedFlag setting, the cyclic shifts $C_v$ for each cyclically-shifted root Zadoff-Chu sequence $x_{u,v}(n)$ may be given as follows:

$$C_v = \begin{cases} vN_{CS} & v = 0, 1, \ldots, \lfloor \frac{N_{ZC}}{N_{CS}} \rfloor - 1, N_{CS} \neq 0 & \text{for unrestricted sets (4a)}, \\ 0 & N_{CS} = 0 & \text{for unrestricted sets (4b)}, \\ d_{start} \lfloor \frac{v}{n_{shift}^{RA}} \rfloor + (v \bmod n_{shift}^{RA})N_{CS} & v = 0, 1, \ldots, n_{shift}^{RA} n_{group}^{RA} + n_{shift}^{-RA} - 1 & \text{for restricted sets (4c)}, \end{cases}$$

where the restricted set parameters $d_{start}$, $n_{shift}^{RA}$, $n_{group}^{RA}$, and $n_{shift}^{-RA}$ will be later detailed.

Accordingly, for an unrestricted case the set of available preamble sequences may be composed of either a single preamble sequence (for $N_{CS}=0$) or $$\lfloor \frac{N_{ZC}}{N_{CS}} \rfloor - 1$$

(for $N_{CS} \neq 0$) different preamble sequences per physical root u. The first available preamble sequences may be given by the 1 or $$\lfloor \frac{N_{ZC}}{N_{CS}} \rfloor - 1$$

cyclic shifts available for the root $u_0$ Zadoff-Chu sequence corresponding to the logical root $\hat{u}_1$ specified in rootSequenceIndex. In the event that all 64 available preamble sequences cannot be generated from the root $u_0$ Zadoff-Chu sequence according to Equations 4a-4b, the remaining preamble sequences of the set of available preamble sequences may be given as the cyclically-shifted root Zadoff-Chu sequences with available cyclic shifts given by Equations 4a-4b and with physical roots corresponding to the logical roots consecutive to the logical root specified in rootSequenceIndex. In other words, the next 1 or $$\lfloor \frac{N_{ZC}}{N_{CS}} \rfloor - 1$$

preamble sequences with available cyclic shifts according to Equations 4a-4b may be given as the root $u_1$ Zadoff-Chu sequences with physical root $u_1$ corresponding to the logical root $\hat{u}_1$ immediately consecutive to $\hat{u}_0$. Such may continue with the 1 or $$\lfloor \frac{N_{ZC}}{N_{CS}} \rfloor - 1$$

preamble sequences for logical root $\hat{u}_2$ immediately consecutive to $\hat{u}_1$ and so forth until all 64 available preamble sequences are given. As previously indicated, the logical-physical root correspondence may be predefined, and accordingly the consecutive progression of logical roots and respectively corresponding physical roots may be predefined.

Accordingly, for an unrestricted case (false highSpeedFlag scenario), mobile terminal 102 may identify the physical root-cyclic shift pairs for each of the available preamble sequences in straightforward manner, i.e. by relying on uniformly-spaced cyclic shifts according to $N_{CS}$. However, as denoted above in Equation 4c, the available cyclic shifts for restricted cases (i.e. high speed scenarios) may require further computation. As previously indicated, the cyclic shifts for high-speed scenarios may need to be carefully selected in order to compensate for spurious peaks caused by Doppler shift in high-speed mobile terminals.

In order to identify the available cyclic shifts for each root Zadoff-Chu sequence, mobile terminal 102 may need to identify each of the restricted set parameters $d_{start}$, $n_{shift}^{RA}$, $n_{group}^{RA}$, and $n_{shift}^{-RA}$ of Equation 3c. The restricted set parameters $d_{start}$, $n_{shift}^{RA}$, $n_{group}^{RA}$, and $n_{shift}^{-RA}$ may depend on the parameter $d_u$ given as follows:

$$d_u = \begin{cases} p & 0 \leq p < N_{ZC} - 2 \\ N_{ZC} - p & \text{otherwise} \end{cases}, \qquad (5)$$

where u is the physical root and p is given as (pu) mod $N_{ZC}=1$, i.e. the modulo inverse of u with respect to modulus $N_{ZC}$.

From $d_u$, the restricted set parameters $d_{start}$, $n_{shift}^{RA}$, $n_{group}^{RA}$, and $n_{shift}^{-RA}$ may be given as follows:

For $N_{CS} \leq d_u < N_{ZC}/3$:

$$n_{shift}^{RA} = \lfloor d_u / N_{CS} \rfloor, \qquad (6a)$$

$$d_{start} = 2d_u + n_{shift}^{RA} N_{CS}, \qquad (6b)$$

$$n_{group}^{RA} = \lfloor N_{ZC} / d_{start} \rfloor, \qquad (6c)$$

$$n_{shift}^{-RA} = \max\left(\left\lfloor \frac{(N_{ZC} - 2d_u - n_{group}^{RA} d_{start})}{N_{CS}} \right\rfloor, 0\right), \qquad (6d)$$

For $\frac{N_{ZC}}{3} \leq d_u \leq (N_{ZC} - N_{CS})/2$ $$n_{shift}^{RA} = \lfloor (N_{ZC} - 2d_u)/N_{CS} \rfloor, \qquad (6e)$$

$$d_{start} = N_{ZC} - 2d_u + n_{shift}^{RA} N_{CS}, \qquad (6f)$$

$$n_{group}^{RA} = \lfloor d_u / d_{start} \rfloor, \qquad (6g)$$

$$n_{shift}^{-RA} = \min(\max(\lfloor (d_u - n_{group}^{RA} d_{start})/N_{CS} \rfloor, 0), n_{shift}^{RA}). \qquad (6h)$$

Accordingly, the restricted set of cyclic shifts high-speed scenarios may each depend on the value of p, which is given as the smallest non-negative integer p that satisfies (pu) mod $N_{ZC}$=1, i.e. the smallest non-negative modulo inverse of physical root u with respect to modulus $N_{ZC}$.

In the case of a restricted set scenario, baseband modem 206 may need to determine p from u using modulus $N_{ZC}$, where $N_{ZC}$=839 for preamble formats 0-3 and $N_{ZC}$=139 for preamble format 4. Accordingly, a brute force approach to identify p may take up to $N_{ZC}$−1 iterations in accordance with the possible range of u from 0 to $N_{ZC}$−2. Such computations by baseband modem 206 may be unnecessarily complex.

In order to simplify computation of p, baseband modem 206 may apply Euler's theorem at 602 in high-speed scenarios requiring use of restricted sets. Euler's theorem is given as follows:

$$a^{\phi(n)} \equiv \{1 (\bmod\ n) \text{ if } a \text{ is relatively prime to } n \qquad (7),$$

where $\phi(n)$ is the number of integers between 1 and n that are relatively prime to n.

Accordingly, baseband modem 206 may apply Euler's theorem with n=$N_{ZC}$. As $N_{ZC}$ is a prime number (in the case of both $N_{ZC}$=139 and $N_{ZC}$=839), $\phi(N_{ZC})=N_{ZC}-1$, i.e. each number between 1 and $N_{ZC}$ is relatively prime to $N_{ZC}$.

Substituting u for a, $N_{ZC}$ for n, and $N_{ZC}$−1 for $\phi(n)=\phi(N_{ZC})$, Equation 7 may be expressed in terms of u and $N_{ZC}$ as follows:

$$u^{N_{ZC}-1} \equiv 1 (\bmod\ N_{ZC}) \qquad (8).$$

Multiplying both sides by $u^{-1}$ yields as follows:

$$u^{N_{ZC}-2} \equiv u^{-1} (\bmod\ N_{ZC}) \qquad (9).$$

The substation of p for $u^{-1}$ (as p is the modulo inverse of u with respect to modulus $N_{ZC}$) then yields:

$$u^{N_{ZC}-2} \equiv p (\bmod\ N_{ZC}) \qquad (10).$$

However, for large exponents $N_{ZC}$−2 with $N_{ZC}$=839 or $N_{ZC}$=139, the application of Equation 10 may require substantial amounts of memory and multiplication operations. Accordingly, baseband modem 206 may instead convert $N_{ZC}$−2 to binary form and calculate the residue for each bit. Baseband modem 206 may then apply the residues for each logical 1 bit of $N_{ZC}$ in order to determine p. By applying such binary modular exponentiation, baseband modem 206 may improve performance by drastically reducing the memory and processing requirements needed for calculation of p according to Equation 10.

Baseband modem 206 may, e.g. at digital processing circuit(s) 206a, initialize a bit array bit_vec that contains the binary representation of $N_{ZC}$−2. In accordance with $N_{ZC}$=839 or $N_{ZC}$=139, bit_vec may have length bit_vec_len of 10 or 8, respectively, where bit_vec[0] is the least significant bit (LSB) and bit_vec[bit_vec_len−1] is the most significant bit (MSB). Both possible bit_vec arrays may be hard-coded into the system memory, e.g. at baseband memory 206b, in order to enable faster processing. The residues res[indx] for 0≤indx<bit_vec_len, i.e. for each element of bit_vec, may then be computed as follows:

$$\text{res}[0]=u \qquad (11a),$$

$$\text{res}[\text{indx}]=(\text{res}[\text{indx}-1]\cdot\text{res}[\text{indx}-1]) \bmod N_{ZC} \qquad (11b).$$

Baseband modem 206 may apply a recursive approach to find p based on each residue res[indx] for 0≤indx<bit_vec_len as follows:

$$p=(p\cdot\text{res}[\text{indx}]) \text{ if } \text{bit}_{\text{vec}[\text{indx}]}=1 \qquad (12).$$

Accordingly, baseband modem 206 may calculate p using the logical 1 bits from the residue vector. As opposed to utilizing a brute force approach, baseband modem 206 may employ Euler's theorem to reduce the number of calculations needed to determine p. Additionally, baseband modem 206 may simplify the modular exponentiation using a binary representation of $N_{ZC}$−2 in order to reduce memory requirements and necessary computations. Upon determining p, baseband modem 206 may apply p to determine $d_u$, $d_{start}$, $n_{shift}^{RA}$, $n_{group}^{RA}$, and $n_{shift}^{-RA}$ in order to identify the reserved set cyclic shift $C_v$ to be paired with u in order for use in generating the preamble sequence. It is appreciated that baseband modem 206 may utilize linear cyclic shifts according to $N_{CS}$ in non-high-speed scenarios in 602.

Baseband modem 602 may apply the following pseudocode in 602 in order to identify p given u and $N_{ZC}$ for a restricted set scenario:

---

Efficient Computation of p (p, u, $N_{ZC}$)

```
if N_ZC = 839
    bit_vec = {1,0,1,0,0,0,1,0,1,1}
    bit_vec_len = 10
else if N_ZC = 139
    bit_vec = {1,1,0,1,0,0,0,1}
    bit_vec_len = 8
else
    bit_vec = binary representation of N_ZC − 2
    bit_vec_len = length(bit_vec)
end if
p = 1; res[0, ..., bit_vec_len − 1] = 0
for indx = 0 to bit_vec_len − 1
    if indx = 0
        res[indx] = u
    else
        res[indx] = (res[indx − 1] * res[indx − 1]) mod N_ZC
    end if
    if bit_vec[indx] = 1
        p = (p * res[indx]) mod N_ZC
    end if
end for
```

---

Baseband modem 206 may implement the efficient computation of p above in order to reduce the number of iterations from $N_{ZC}$ to bit_vec_len iterations, i.e. either 8 or 10 iterations. Additionally, the binary residue computation of p detailed above may the reduce memory requirements and number of multiplication operations required to find p.

Baseband modem 206 may at the conclusion of 602 possess the physical root-cyclic shift pair $C_v$ and u characterizing the selected preamble sequence. Baseband modem 106 may then proceed to 604 to calculate the DFT $X_{u,v}(k)$ of $x_{u,v}(n)$ directly from u and $C_v$.

Direct DFT Calculation

Baseband modem 206 may in 604 calculate $X_{u,v}(k)$, where $X_{u,v}(k)$ is the Discrete Fourier Transform (DFT) of $C_v$-shifted root u Zadoff-Chu sequence $x_{u,v}(n)$. As opposed to generating $x_{u,v}(n)$ from u, $C_v$, and $N_{ZC}$ according to Equation 3 and subsequently calculating $X_{u,v}(k)$ from $x_{u,v}(n)$ using a DFT, baseband modem 206 may instead directly calculate $X_{u,v}(k)$ from u, $C_v$, and $N_{ZC}$ without generating $x_{u,v}(n)$.

Baseband modem 206 may directly calculate $X_{u,v}(k)$ by applying unique properties of Zadoff-Chu sequences and the related Fourier transforms. Additionally, baseband modem 206 may utilize recursive phase computation in order to simplify computational processing. Furthermore, baseband modem 206 may utilize integer arithmetic instead of floating point arithmetic in order to avoid error propagation due to rounding and reduce computational memory requirements.

As previously detailed, the cyclically-shifted root Zadoff-Chu sequence $x_{u,v}(n)$ may be $N_{ZC}$ symbols in length. In accordance with an Single Carrier Frequency Division Multiple Access (SC-FDMA) uplink modulation scheme as specified by 3GPP, baseband modem 206 may first apply a DFT to the cyclically-shifted root Zadoff-Chu sequence $x_{u,v}(n)$ to distribute the $N_{ZC}$ symbols of $x_{u,v}(n)$ in frequency over the 6 PRB bandwidth of the PRACH (e.g. as detailed regarding FIG. 4), thus producing a frequency transform $X_{u,v}(k)$ of $x_{u,v}(n)$.

Accordingly, the computation of $X_{u,v}(k)$ may be conventionally performed in a two-part process by first generating the full $N_{ZC}$-length sequence for $x_{u,v}(n)$ with n, $C_v$, and $N_{ZC}$ according to Equations 2 and 3 and subsequently applying an $N_{ZC}$-point DFT to $x_{u,v}(n)$ to compute $X_{u,v}(k)$.

However, this two-part process may introduce unnecessary computational load into the baseband modem 206. Baseband modem 206 may instead apply direct DFT calculation of $X_{u,v}(k)$ in order to improve processing efficiency and potentially reduce computational rounding errors.

As previously indicated, $X_{u,v}(k)$ is the Discrete Fourier Transform of $x_{u,v}(n)$, where $x_{u,v}(n)=x_u(n+C_v)$ (mod $N_{ZC}$) as specified in Equation 3. Applying a DFT to $x_{u,v}(n)$ thus yields $X_{u,v}(k)$ as follows:

$$X_{u,v}(k) = \sum_{n=0}^{N_{ZC}-1} x_{u,v}(n) e^{-\frac{j2\pi nk}{N_{ZC}}}, \quad (13)$$

where $0 \leq k \leq N_{ZC}-1$.

Applying the DFT time-shift property and the relationship $x_{u,v}(n)=x_u(n+C_v)$(mod $N_{ZC}$) reduces Equation 13 as follows:

$$X_{u,v}(k) = X_u(k) e^{\frac{j2\pi C_v k}{N_{ZC}}}, \quad (14)$$

where $X_u(k)$ is the DFT of root Zadoff-Chu sequence $x_u(n)$.

Similarly, $X_u(k)$ may be given by applying a DFT to $x_{u,v}(n)$ as follows:

$$X_u(k) = \sum_{n=0}^{N_{ZC}-1} x_u(n) e^{-\frac{j2\pi kn}{N_{ZC}}}. \quad (15)$$

Substituting Equation 2 into Equation 15 yields:

$$X_u(k) = \sum_{n=0}^{N_{ZC}-1} e^{-\frac{j\pi u n(n+1)}{N_{ZC}}} e^{-\frac{j2\pi kn}{N_{ZC}}}, \quad (16)$$

which simplifies to:

$$X_u(k) = \sum_{n=0}^{N_{ZC}-1} e^{-\frac{j\pi(un(n+1)+2kn)}{N_{ZC}}}. \quad (17)$$

As detailed in "Efficient Computation of DFT of Zadoff-Chu Sequences", S. Beyme and C. Leung, Electronics Letters Vol. 45 No. 9, 23 Apr. 2009 (herein referred to as "Efficient Computation") Equation 17 may be factored by $$e^{\frac{j\pi u(u^{-1}k)(u^{-1}k+1)}{N_{ZC}}},$$

thus yielding:

$$X_u(k) = e^{\frac{j\pi u(u^{-1}k)(u^{-1}k+1)}{N_{ZC}}} \sum_{n=0}^{N_{ZC}-1} e^{-\frac{j\pi u(n+u^{-1}k)(n+u^{-1}k+1)}{N_{ZC}}}. \quad (18)$$

In accordance with Equation 2 and accounting for the periodicity $N_{ZC}$ for $x_u(n)$, the following relationship of factor $$e^{\frac{j\pi u(u^{-1}k)(u^{-1}k+1)}{N_{ZC}}}$$

can be derived:

$$e^{\frac{j\pi u(u^{-1}k)(u^{-1}k+1)}{N_{ZC}}} = x_u^*(u^{-1}k). \quad (19)$$

As further detailed in "Efficient Computation", due to the periodicity of $x_u(n)$ over $N_{ZC}$, the summation of Equation 18 remains the same if taken over any set of $N_{ZC}$ samples of $x_u(n)$. Accordingly, the summation of Equation 18 may be expressed and simplified as follows:

$$\sum_{n=0}^{N_{ZC}-1} e^{-\frac{j\pi u(n+u^{-1}k)(n+u^{-1}k+1)}{N_{ZC}}} = \sum_{n=0}^{N_{ZC}-1} x_u(n+u^{-1}k), \quad (20a)$$

$$= \sum_{n=0}^{P-1} x_u(n), \quad (20b)$$

$$= X_u(0). \quad (20c)$$

Applying the results of Equation 19 and Equation 20c in Equation 18 yields:

$$X_u(k) = x_u^*(u^{-1}k) X_u(0) \quad (21).$$

Furthermore, as detailed in "Efficient Computation", $x_u^*(u^{-1}k)$ may be shown to be a frequency-shifted version of $x_{u^{-1}}^*(k)$ by the following expansion of Equation 19:

$$x_u^*(u^{-1}k) = e^{\frac{j\pi u(u^{-1}k)(u^{-1}k+1)}{N_{ZC}}}, \quad (22a)$$

$$= e^{\frac{j\pi u^{-1}k(k+1)}{N_{ZC}}} e^{\frac{j2\pi(1-u^{-1})2^{-1}}{N_{ZC}}}, \quad (22b)$$

$$= x_{u^{-1}}^*(k) e^{\frac{j2\pi k(1-u^{-1})2^{-1}}{N_{ZC}}}. \quad (22c)$$

$X_u(k)$ may thus be expressed as follows:

$$X_u(k) = x_{u-1}^*(k) e^{\frac{j2\pi k(1-u^{-1})2^{-1}}{N_{ZC}}} X_u(0). \quad (23)$$

Baseband modem 206 may thus apply the result of Equation 23 in order to directly calculate $X_{u,v}(k)$ from $u$, $C_v$, and $N_{ZC}$ in accordance with the direct DFT computation of 604. Referring back to Equation 14, $X_{u,v}(k)$ may be expressed as follows using the result for $X_u(k)$ of Equation 23 and X:

$$X_{u,v}(k) = x_{u-1}^*(k) e^{\frac{j2\pi k(1-u^{-1})2^{-1}}{N_{ZC}}} e^{\frac{j2\pi k C_v}{N_{ZC}}} X_u(0). \quad (24)$$

Equation 24 may be simplified as follows using the substitution $2 \cdot 2^{-1} = (N_{ZC}+1)$:

$$X_{u,v}(k) = e^{\frac{j\pi u^{-1} k(k+1)}{N_{ZC}}} e^{\frac{j2\pi k(1-u^{-1})2^{-1}}{N_{ZC}}} e^{\frac{j2\pi k C_v}{N_{ZC}}} X_u(0), \quad (25a)$$

$$= e^{\frac{j2\pi}{N_{ZC}} \left[ \frac{u^{-1} k(k+1)}{2} + \frac{(1-u^{-1})(N_{ZC}+1)k}{2} + C_v k \right]}, \quad (25b)$$

$$= e^{j\Phi_u(k)}, \quad (25c)$$

for $0 \leq k \leq N_{ZC} - 1$, where:

$$\Phi_u(k) = \frac{2\pi}{N_{ZC}} \left[ \frac{u^{-1} k(k+1)}{2} + \frac{(1-u^{-1})(N_{ZC}+1)k}{2} + C_v k \right]. \quad (26)$$

Accordingly, baseband modem 206 may in 604 directly compute $X_{u,v}(k)$ (i.e. without explicitly computing $x_{u,v}(n)$) from $u$, $C_v$, and $N_{ZC}$ as a sequence of complex exponentials according to Equations 25c and 26.

In order to maximize processing efficiency (thus reducing computational load) and minimize error, baseband modem 206 may recursively compute the phase term $\Phi_u(k)$ for $0 \leq k \leq N_{ZC}-1$ using integer arithmetic. In doing so, baseband modem 206 may avoid rounding error, which may accumulate through successive recursions. Equation 26 may thus be factored by $$\frac{2\pi}{N_{ZC}}$$

to obtain an integer expression as follows:

$$\Phi_u(k) = \frac{2\pi}{N_{ZC}} [\Omega_u(k)], \quad (27)$$

where:

$$\Omega_u(k) = \frac{u^{-1} k(k+1)}{2} + \frac{(1-u^{-1})(N_{ZC}+1)k}{2} + C_v k, \quad (28)$$

for $0 \leq k \leq N_{ZC}-1$.

$\Omega_u(k)$ as expressed in Equation 28 may thus be the integer component of the phase term $\Phi_u(k)$ of $X_{u,v}(k)$, where each $\Phi_u(k)$ is an integer multiple of $\Omega_u(k)$.

Baseband modem 206 may calculate each $\Omega_u(k)$ in a recursive manner utilizing $\Omega_u(k-1)$ as follows:

$$\Omega_u(k) = \left( \frac{u^{-1}(k-1)k}{2} + u^{-1} k \right) + \quad (29a)$$

$$\frac{(1-u^{-1})(N_{ZC}+1)(k-1+1)}{2} +$$

$$C_v(k-1+1),$$

$$= \Omega_u(k-1) + \left( u^{-1} k + \frac{(1-u^{-1})(N_{ZC}+1)}{2} + C_v \right), \quad (29b)$$

$$= \Omega_u(k-1) + \Theta(k), \quad (29c)$$

where $1 \leq k \leq N_{ZC}-1$ and initialization of $\Omega_u(0)=0$

Baseband modem 206 may therefore calculate each integer phase term $\Omega_u(k)$ from the $\Omega_u(k-1)$ term by adding a phase difference $\Theta(k)$. Phase difference $\Theta(k)$ as substituted into Equation 29c may be expressed as follows:

$$\Theta(k) = \left( u^{-1} k + \frac{(1-u^{-1})(N_{ZC}-1)}{2} + C_v \right), \quad (30)$$

for $1 \leq k \leq N_{ZC}-1$.

Baseband modem 206 may similarly compute each phase difference $\Theta(k)$ from the previous phase difference $\Theta(k-1)$ as follows:

$$\Theta(k) = \Theta(k-1) + u^{-1} \quad (31),$$

where $\Theta(0)$ is initialized as $$\Theta(0) = \left( \frac{(1-u^{-1})(N_{ZC}+1)}{2} + C_v \right).$$

Baseband modem 206 may thus apply the results of Equations 25-30 to recursively calculate the integer phase term $\Omega_u(k)$ for each sample $k$ of $X_{u,v}(k)$, $0 \leq k \leq N_{ZC}-1$. As each $\Omega_u(k)$ is an exclusively integer expression, baseband modem 206 may apply integer arithmetic to compute each $\Omega_u(k)$, and accordingly may avoid the introduction of rounding error into the calculation.

In summary of the equations detailed above, baseband modem 206 may apply the following pseudocode to directly compute $X_{u,v}(n)$ from $u$, $C_v$, and $N_{ZC}$ using recursive integer arithmetic:

---

Direct DFT Computation ($u$, $C_v$, $N_{ZC}$)

Initialize $\Theta(0) = \left( \dfrac{(1-u^{-1})(N_{ZC}+1)}{2} + C_v \right)$

Initialize $\Omega_u(0) = 0$ $\Phi_u(0) = \dfrac{2\pi}{N_{ZC}} (\Omega_u(0))$ $X_{u,v}(0) = e^{j\Phi_u(0)}$
for $k = 1$ to $N_{ZC} - 1$
   $\Theta(k) = (\Theta(k-1) + u^{-1}) (\bmod\ N_{ZC})$
   $\Omega_u(k) = (\Omega_u(k-1) + \Theta(k)) (\bmod\ N_{ZC})$ -continued Direct DFT Computation (u, $C_v$, $N_{ZC}$)

$$\Phi_u(k) = \frac{2\pi}{N_{ZC}}(\Omega_u(k))$$

$$X_{u,v}(k) = e^{j\Phi_u(k)}$$
end for

Baseband modem 206 may thus directly compute $X_{u,v}(k)$ in 604 from u, $C_v$, and $N_{ZC}$ using solely integer arithmetic by executing the Direct DFT Computation pseudocode. Additionally, baseband modem 206 may compute the iterative updates to $\Theta(k)$ and $\Omega_u(k)$ with respect to modulus $N_{ZC}$, thus ensuring each $\Theta(k)$ and $\Omega_u(k)$ is limited to integer values less than $N_{ZC}$. As previously indicated, baseband modem 206 may apply integer arithmetic during the recursive phase calculations of $\Theta(k)$ and $\Omega_u(k)$ to prevent rounding error. Baseband modem 206 may apply the factor $$\frac{2\pi}{N_{ZC}}$$

as detailed regarding Equation 27 after performing the integer computation of $\Omega_u(k)$ to compute each $\Theta_u(k)$. Accordingly, baseband modem 206 may apply a recursive modulo-integer arithmetic computational approach to directly compute the DFT $X_{u,v}(k)$ in 604.

Alternatively, it is appreciated that baseband modem 206 may compute the phase term $\Theta_u(k)$ for each $X_{u,v}(k)$ using floating point arithmetic. Although such may introduce a certain degree of rounding error to computation of $X_{u,v}(k)$, it is appreciated that baseband modem 206 may still impart certain processing improvements due to the recursive calculation.

Alternatively, it is appreciated that baseband modem 206 may utilize integer arithmetic as detailed above but calculate each $X_{u,v}(k)$ by using conventional computation instead of recursive calculation. Such may allow baseband modem 206 to avoid rounding error but may sacrifice the computational efficiency of a recursive calculation scheme. It is thus appreciated that baseband modem 206 may apply various different approaches to compute $X_{u,v}(k)$ in 604. However, it is recognized a recursive integer arithmetic approach may be preferred.

Parallel IDFT Computation

Baseband modem 206 may therefore obtain the DFT $X_{u,v}(k)$ of cyclically-shifted root Zadoff-Chu sequence $x_{u,v}(n)$ following 604. It is appreciated that baseband modem 206 may obtain $X_{u,v}(k)$ in an alternate manner to performing direct DFT calculation of $X_{u,v}(k)$ and/or by performing efficient cyclic shift computation of $C_v$ (e.g. in a high-speed scenario requiring calculation of p). Alternatively, it is appreciated that baseband modem 206 may obtain $C_v$ in a different manner from efficient cyclic computation, such as by performing a brute force approach to determine p and $C_v$ (e.g. in a high-speed scenario), and/or may obtain $X_{u,v}(k)$ in a different manner from direct DFT calculation, such as by generating cyclically-shifted root Zadoff-Chu sequence $x_{u,v}(n)$ according to Equation 3 and applying a DFT to $x_{u,v}(n)$ to obtain $X_{u,v}(k)$. Regardless, baseband modem 206 may obtain $X_{u,v}(k)$ following 604.

As previously detailed, $X_{u,v}(k)$ may be an $N_{ZC}$-length (e.g. 839 or 139) frequency-domain representation of cyclically-shifted root Zadoff-Chu sequence $x_{u,v}(n)$. As random access preamble s(m) is a time-domain signal, baseband modem 206 may transform $X_{u,v}(k)$ into a time-domain signal $s_{u,v}(m)$ (followed by sequence repetition in 612 and cyclic prefix insertion in 614 as shown in FIG. 6).

Referring back to FIG. 4, random access preambles may be mapped to the equivalent of 6 PRBs in the frequency domain. In accordance with an LTE context as specified by 3GPP, each conventional uplink PRB may be composed of 12 subcarriers evenly spaced every 15 kHz, i.e. $N_{sc}^{RB}=12$ and $\Delta f=15$ kHz, thus yielding a 180 kHz PRB bandwidth. Accordingly, 6 PRBs utilized for conventional uplink communications (e.g. PUSCH, PUCCH, etc.) may be composed of $6 \cdot N_{sc}^{RB}=72$ subcarriers spanning a total bandwidth of 1.08 MHz.

Accordingly, given the substantial length ($N_{ZC}=139$ or $N_{ZC}=839$) of $X_{u,v}(k)$, the PRACH must utilize a denser subcarrier spacing $\Delta f_{RA}$ than the conventional uplink subcarrier spacing $\Delta f$. Specifically, "3GPP TS 36.211 (Release 12)" has specified $\Delta f_{RA}=1.25$ kHz for preamble formats 0-3 ($N_{ZC}=839$) and $\Delta f_{RA}=7.5$ kHz for preamble format 4, thus yielding a total of 864 subcarriers for preamble formats 0-3 and 144 subcarriers for preamble format 4.

Focusing on a preamble formats 0-3 context (although equally applicable to preamble format 4), baseband modem 206 may therefore need to map each of the 839 ($N_{ZC}$) symbols of $X_{u,v}(k)$ to one of the 864 subcarriers with PRACH subcarrier spacing $\Delta f_{RA}=1.25$ kHz. Baseband modem 206 may then need to transform the resulting subcarrier-mapped signal into the time-domain to obtain $s_{u,v}(m)$.

Baseband modem 206 may utilize an Inverse Discrete Fourier Transform (IDFT) to transform $X_{u,v}(k)$ into the time-domain as $s_{u,v}(m)$. However, in order to preserve the high-frequency resolution of $X_{u,v}(k)$ over the complete uplink system bandwidth (e.g. 3 MHz in the exemplary case of FIG. 4) in accordance with PRACH subcarrier spacing $\Delta f_{RA}=1.25$ kHz, baseband modem 206 may need to apply a substantially large IDFT operation in order to obtain $s_{u,v}(m)$ from $X_{u,v}(k)$. Specifically, baseband modem 206 may need to apply an $N_{DFT}^{RA}$-point IDFT, where $N_{DFT}^{RA}=K \cdot N_{FFT}^{UL}$, $K=\Delta f/\Delta f_{RA}$ (i.e. the ratio of conventional uplink subcarrier spacing to PRACH subcarrier spacing), and $N_{FFT}^{UL}$ is the uplink FFT size (dependent on system bandwidth). For example, referring the exemplary case of FIG. 4 with K=12 and $N_{FFT}^{UL}=256$ (in accordance with a 3 MHz system bandwidth), baseband modem 206 may need to perform an $N_{DFT}^{RA}=3072$-point IDFT in order to effectively transform $X_{u,v}(k)$ into the time-domain (i.e. without losing the frequency resolution of $X_{u,v}(k)$ during transformation). For larger LTE system bandwidths, such as a 20 MHz bandwidth with $N_{FFT}^{UL}=2048$, baseband modem 206 may need to perform an $N_{DFT}^{RA}=24576$ point IDFT, which may be substantially prohibitive to implement in practice.

In order to simplify the IDFT operation, baseband modem 206 may instead utilize parallel IDFT computation in 602-610 of the enhanced random access preamble generation procedure shown in FIG. 6. As will be detailed, baseband modem 206 may divide the $N_{DFT}^{RA}$-point IDFT into L Inverse Fast Fourier Transform (IFFT) operations (IDFT decomposition in 606). Baseband modem 206 may then apply parallel processing in order to execute the L IFFT operations (parallel IFFT in 608). Baseband modem 206 may then shuffle and merge the parallel IFFT output in 610. Additionally, baseband modem 206 may perform a frequency shift operation during the shuffle and merge of 610 in order to properly align the random access preamble within the 6 PRB bandwidth of the PRACH frequency resources.

Baseband modem 206 may thus obtain $s_{u,v}(m)$ following 610, which may still need to undergo sequence repetition (if needed dependent on preamble format) and cyclic prefix insertion in 612 and 614, respectively.

Accordingly, baseband modem 206 may perform IDFT decomposition in 606 in order to prepare for the $N_{DFT}^{RA}$-point parallel IFFT computation in 608. 606 may receive $X_{u,v}(k)$ as an input, where $X_{u,v}(k)$ is of length $N_{ZC}=839$ or $N_{ZC}=139$ as previously detailed dependent on preamble format.

Baseband modem 206 may need to apply an $N_{DFT}^{RA}$-point IDFT operation on $X_{u,v}(k)$ in order to obtain $s_{u,v}(m)$, where $N_{RA}^{DFT}=K \cdot N_{FFT}^{UL}$ and $N_{FFT}^{UL}=128, 256, 512, 1024,$ or 2048 depending on the number of uplink PRBs $N_{RB}^{UL}$. Specifically, baseband modem 206 may calculate $s_{u,v}(m)$, $0 \le m \le N_{DFT}^{RA}-1$ (where $s_{u,v}(m)$ is the digital version of $s_{u,v}(t)$ prior to digital-to-analog conversion) as follows:

$$s_{u,v}(m) = \sum_{i=0}^{N_{DFT}^{RA}-1} X_{IDFT}(i)e^{\frac{j2\pi im}{N_{DFT}^{RA}}}, \quad (32)$$

where $0 \le m \le N_{DFT}^{RA}-1$ and $X_{IDFT}(i)$, $0 \le i \le N_{DFT}^{RA}$ is an $N_{DFT}^{RA}$-length zero-padded version of $X_{u,v}(k)$, i.e. $X_{IDFT}(0: N_{ZC}-1) = X_{u,v}(0: N_{ZC}-1)$ and $X_{IDFT}(N_{ZC}: N_{DFT}^{RA}-1)=0$.

However, such a large IDFT computation may be computationally intensive. Accordingly, as opposed to applying a straightforward $N_{DFT}^{RA}$-point IDFT operation baseband modem 206 may instead simplify the computation by dividing the $N_{DFT}^{RA}$ sample points in to L groups each of size $N_{FFT}^{RA}=N_{DFT}^{RA}/L$. Baseband modem 206 may then apply L separate $N_{FFT}^{RA}$-point IFFT operations on $X_{u,v}(k)$ in place of a single $N_{DFT}^{RA}$-point IDFT. Baseband modem 206 may thus reduce the computational load due to the relatively superior processing efficiency of IFFT compared to IDFT combined with the reduced IFFT size and the ability to implement parallel processing.

Each IDFT sample index m may be expressed as follows:

$$m = aL+g \quad (33),$$

where $g \in \{0, 1, \ldots, L-1\}$ is the group number and $a \in \{0, 1, \ldots, N_{DFT}^{RA}-1\}$ is the sample index number within the group.

In order to effectively apply an IFFT of size $N_{FFT}^{RA}$ to $X_{u,v}(k)$, baseband modem 206 may utilize an $N_{FFT}^{RA}$ greater than or equal to $N_{ZC}$. As $N_{ZC}=139$ or $N_{ZC}=839$ in accordance with an LTE context, baseband modem 206 may select the minimum value of $N_{FFT}^{RA}$ to be 1024 (i.e. the smallest power of two greater than the total number of sample points). Furthermore, baseband modem 206 may limit $N_{FFT}^{RA}$ to be less than or equal to the maximum FFT-size, e.g. 2048 in accordance with an LTE context (for $N_{RB}^{UL}=75$ or $N_{RB}^{UL}=100$). Additionally, further factors may be considered such as the computational power available for FFT/IFFT operations by digital processing circuit(s) 206a of baseband modem 206.

Baseband modem 206 may therefore select $N_{FFT}^{RA}$ utilizing the lower and upper limits depending on $N_{DFT}^{RA}$, where $N_{FFT}^{UL}=128, 256, 512, 1024, 1536,$ or 2048 in accordance with an LTE context. For example, baseband modem 206 may apply the following pseudocode in 606 to select $N_{FFT}^{RA}$:

| Selection of $N_{FFT}^{RA}$ ($N_{DFT}^{RA}$) |
|---|
| if mod ($N_{DFT}^{RA}$, 2048) = 0 |
|     $N_{FFT}^{RA}$ = 2048 |
| else if mod ($N_{DFT}^{RA}$, 1536) = 0 |
|     $N_{FFT}^{RA}$ = 1536 |
| else if mod ($N_{DFT}^{RA}$, 1024) = 0 |
|     $N_{FFT}^{RA}$ = 1024 |
| else |
|     $N_{FFT}^{RA} = N_{DFT}^{RA}$ |
| end if |
| $L = N_{DFT}^{RA}/N_{FFT}^{RA}$ |

Accordingly, baseband modem 206 may select $N_{FFT}^{RA}$ and L during IDFT decomposition in 606 in order to determine the sample division for the parallel IFFT computation in 608.

Additionally, baseband modem 206 may in 606 prepare $X_{u,v}(k)$ for IFFT computation by zero-padding $X_{u,v}(k)$ in order to obtain $X_{IFFT}(l)$ as follows:

$$X_{IFFT}(l) = \begin{cases} X_{u,v}(l) & \text{for } l = 0, 1, \ldots, N_{ZC}-1 \\ 0 & \text{for } l = N_{ZC}, \ldots, N_{FFT}^{RA}-1 \end{cases} \quad (34)$$

Baseband modem 206 may then provide $X_{IFFT}(l)$ along with L and $N_{FFT}^{RA}$ to 608 for parallel IFFT computation.

Baseband modem 206 may then apply parallel IFFT computation of $X_{IFFT}(l)$ in 608. Substituting Equation 33 into Equation 32 yields as follows:

$$s_{u,v}(m) = s_{u,v}(aL+g) = \sum_{i=0}^{N_{DFT}^{RA}-1} X_{IDFT}(i) e^{\frac{j2\pi i(aL+g)}{N_{DFT}^{RA}}}, \quad (35)$$

where $0 \le a \le N_{FFT}^{RA}-1$ and $0 \le g \le L-1$.

Factorizing the complex exponential of Equation 35 and simplifying with the substitution $N_{DFT}^{RA}=L \cdot N_{FFT}^{RA}$ then yields:

$$s_{u,v}(aL+g) = \sum_{i=0}^{N_{DFT}^{RA}-1} X_{IDFT}(i) e^{\frac{j2\pi i \cdot aL}{LN_{FFT}^{RA}}} e^{\frac{j2\pi i \cdot g}{N_{DFT}^{RA}}}, \quad (36a)$$

$$= \sum_{i=0}^{N_{DFT}^{RA}-1} X_{IDFT}(i) e^{\frac{j2\pi i \cdot a}{N_{FFT}^{RA}}} e^{\frac{j2\pi i \cdot g}{N_{DFT}^{RA}}}, \quad (36b)$$

where $0 \le a \le N_{FFT}^{RA}-1$ and $0 \le g \le L-1$.

Selecting $N_{FFT}^{RA} > N_{ZC}$ (as detailed above) and applying the substitution $X_{IDFT}(0: N_{FFT}^{RA}-1) = X_{IFFT}(0: N_{FFT}^{RA}-1)$ and $X_{IDFT}(N_{FFT}^{RA}: N_{DFT}^{RA}-1)=0$ (as detailed above regarding Equation 33) then gives the following:

$$s_{u,v}(m) = s_{u,v}(aL+g) = \sum_{i=0}^{N_{FFT}^{RA}-1} X_{IFFT}(i) e^{\frac{j2\pi i a}{N_{FFT}^{RA}}} e^{\frac{j2\pi i g}{N_{DFT}^{RA}}}, \quad (37)$$

where $0 \le a \le N_{FFT}^{RA}-1$, $0 \le g \le L-1$, and $X_{IFFT}(l)$, $0 \le l \le N_{FFT}^{RA}-1$, is the $N_{FFT}^{RA}$-length zero-padded version of $N_{ZC}$-length $X_{u,v}(k)$ according to Equation 34.

Baseband modem 206 may therefore calculate $s_{u,v}(m)$ by applying L separate $N_{DFT}^{RA}$-point IFFT computations $IFFT_0$–$IFFT_{L-1}$. Each IFFT computation $IFFT_g$, $0 \leq g \leq L-1$, may thus produce $N_{FFT}^{RA}$ samples $s_{u,v}(aL+g)$ for $0 \leq a \leq N_{FFT}^{RA}-1$ using an $N_{FFT}^{RA}$-point IFFT. Accordingly, baseband modem 206 may realize Equation 37 by performing L separate IFFT computations $IFFT_0$–$IFFT_{L-1}$ in parallel. The input to each IFFT computation $IFFT_0$–$IFFT_{L-1}$ may be a phase shifted version of $X_{IFFT}(l)$, where the input to a given IFFT computation $IFFT_g$ is given as $$X_{IFFT}(l) \cdot e^{\frac{j2\pi lg}{N_{DFT}^{RA}}}.$$

Figure 7:
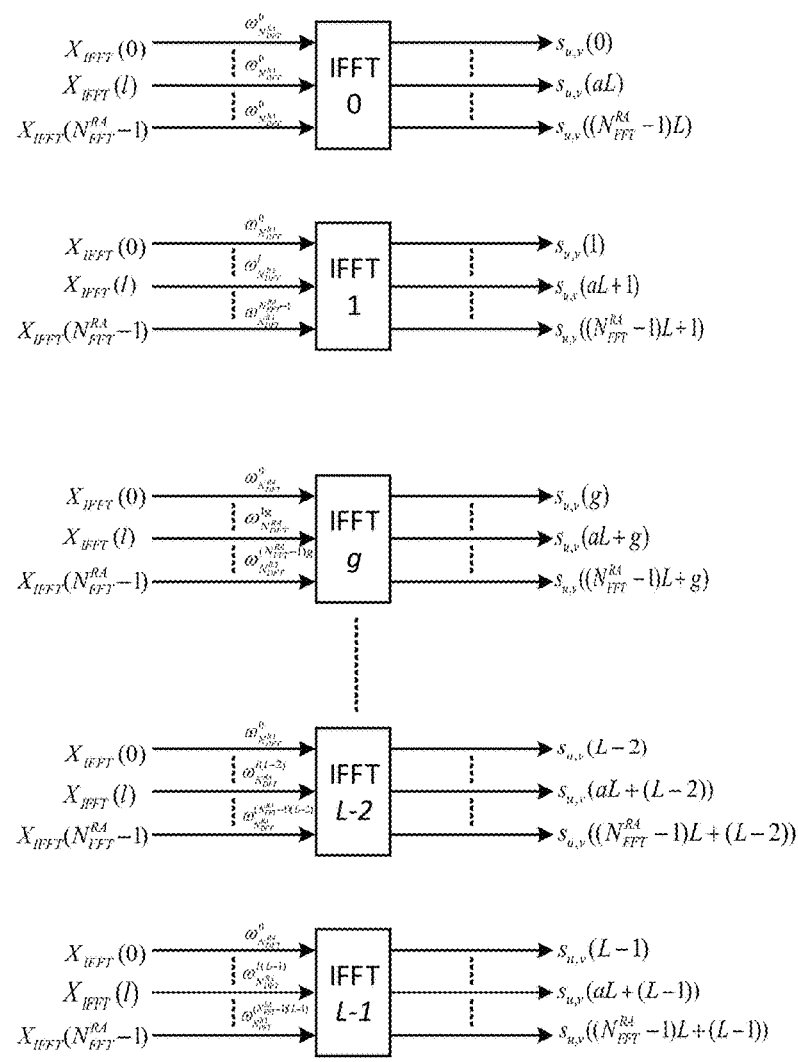
FIG. 7 shows a block diagram illustrating parallel IFFT computation.

FIG. 7 shows block diagram 700 illustrating the parallel IFFT computation of 608. As detailed above, each $N_{FFT}^{RA}$-point IFFT computation $IFFT_0$–$IFFT_{L-1}$ may a frequency shifted version of $X_{IFFT}(l)$, where each $l^{th}$ input sample to a given IFFT computation $IFFT_g$ is frequency shifted by $$e^{\frac{j2\pi lg}{N_{DFT}^{RA}}}$$

for $0 \leq l \leq N_{FFT}^{RA}-1$. The frequency shift for each $l^{th}$ input sample may thus be represented as "twiddle factor"

$$\omega_N^i = e^{\frac{j2\pi i}{N}}.$$

Baseband modem 206 may execute each of the L IFFT computation blocks independently of the other IFFT computation blocks. Accordingly, baseband modem 206 may execute the L IFFT computation blocks in parallel with one another. As previously indicated, baseband modem 206 may thus be structurally configured to perform parallel processing operations. In particular, digital processing circuit(s) 206a may contain at least one parallel processing circuit. For example, digital processing circuit(s) 206a may contain a GPU configured to execute parallel IFFT computations, e.g. at least L independent $N_{FFT}^{RA}$-point IFFT computations. Alternatively, digital processing circuit(s) 206a may contain one or more ASICs configured to execute parallel IFFT computations, e.g. at least L independent $N_{FFT}^{RA}$-point IFFT computations. It is appreciated that many such variations are possible and thus embraced herein.

By performing parallel computation of L $N_{FFT}^{RA}$-point IFFT calculations in 608 as opposed to a single $N_{DFT}^{RA}$-point IDFT, baseband modem 206 may significantly increase the efficiency in calculation of $s_{u,v}(m)$, such as by increasing the calculation speed and reducing the memory requirements in calculation of $s_{u,v}(m)$. In particular, the reduced complexity of IFFT as compared to IDFT may reduce the number of computational operations required to perform the time-domain transformation of $X_{u,v}(k)$. Additionally, the ability to optimize the parallel processing of the L IFFT computations may allow for more efficient processing due to the ability to optimize the configuration of baseband modem 206 for parallel processing.

It is also appreciated that baseband modem 206 may obtain both speed and memory improvements by performing 608 with a serial implementation due to the benefits of reduced-size IFFT over large scale IDFT, although in particular speed improvements may be maximized in a parallel implementation.

Accordingly, baseband modem 206 may obtain each of the samples of $s_{u,v}(m)$, $0 \leq m \leq N_{DFT}^{RA}-1$ at the output of 608. However, as can be seen in the outputs of IFFT calculation blocks $IFFT_0$–$IFFT_{L-1}$, the samples of $s_{u,v}(m)$ are not in order as a result of the IDFT decomposition and parallel IFFT computation in 606 and 608, respectively.

Baseband modem 206 may therefore implement a shuffle and merge operation in 610 in order to re-order the samples of $s_{u,v}(m)$ to into the correct order.

Additionally, baseband modem 206 may need to perform a time-domain frequency shift on $s_{u,v}(m)$ in order to properly map the random access preamble to the assigned PRACH frequency resources according to the parameters $\varphi$ and $k_0$ introduced regarding Equation 1. Baseband modem 206 may either first perform the shuffle and merge operation in 610 to recover $s_{u,v}(m)$ and subsequently perform the time-domain frequency shift, or may alternatively perform the time-domain frequency shift during the shuffle and merge operation of 610 in order to increase efficiency. The appropriate frequency shift $$\omega_{N_{DFT}^{RA}}^{am} = e^{\frac{j2\pi(\varphi+K(k_0+1/2))m}{N_{DFT}^{RA}}}, \qquad (19)$$

for the $m^{th}$ sample of $s_{u,v}(m)$ is given as follows:

$$e^{\frac{j2\pi a}{N_{DFT}^{RA}}} = \omega_{N_{DFT}^{RA}}^{am}$$

where $\alpha = \varphi + K(k_0 + \frac{1}{2})$ gives the proper positioning of the random access preamble within the 6 PRB bandwidth of the PRACH.

The outputs of each IFFT calculation block $IFFT_g$, $0 \leq g \leq L-1$, may be denoted as $IFFT_{g,out}(l)$, $0 \leq l \leq N_{FFT}^{RA}-1$, where each IFFT output sample $IFFT_{g,l}$ is a sample of $s_{u,v}(m)$ (un-shifted) as shown in FIG. 7. Baseband modem 206 may apply the following pseudocode in 610 in order to perform a concurrent shuffle, merge, and frequency shift operation in order to re-order and shift the samples of each IFFT calculation block output $IFFT_{g,out}(l)$, $0 \leq g \leq L-1$ and $0 \leq l \leq N_{FFT}^{RA}-1$ to recover $s_{u,v}(m)$ and perform the appropriate frequency-shift:

---

Shuffle, Merge, and Shift ($IFFT_{0,out}, \ldots, IFFT_{g,out}, \ldots, IFFT_{L-1,out}$)

Initialize $\alpha = \varphi + K(k_0 + 1/2)$
    Allocate $s_{u,v}[N_{DFT}^{RA}]$
    for g = 0 to L − 1
        indx = g
        for l = 0 to $N_{FFT}^{RA} - 1$ $s_{u,v}(indx) = IFFT_{g,out}(l) \cdot \omega_{N_{DFT}^{RA}}^{\alpha l}$ indx = indx + L
        end for
    end for

---

Accordingly, baseband modem 206 may apply the Shuffle, Merge, and Shift pseudocode to the outputs of IFFT computation blocks $IFFT_0$–$IFFT_{L-1}$ to obtain $s_{u,v}(m)$. It is appreciated that baseband modem 106 may optionally apply the time-domain frequency shift separately from the shuffle and merge operation, thus dividing the procedure into a two-part process. However, baseband modem 206 may obtain higher processing efficiency by performing the frequency shift during the shuffle and merge procedure.

Additionally, baseband modem 206 may apply the shuffle and merge and/or frequency-shift in a parallel manner. Accordingly, baseband modem 206 may execute each iteration of the loop over g for $0 \leq g \leq L-1$ independently in parallel. Baseband modem 206 may obtain higher processing efficiency by executing the loop in parallel, and may thus be configured to perform parallel processing during the shuffle, merge, and/or frequency shift execution. Alternatively, baseband modem 206 may executed the loop in serial, e.g. by looping through each iteration individually in sequence.

Figure 8:
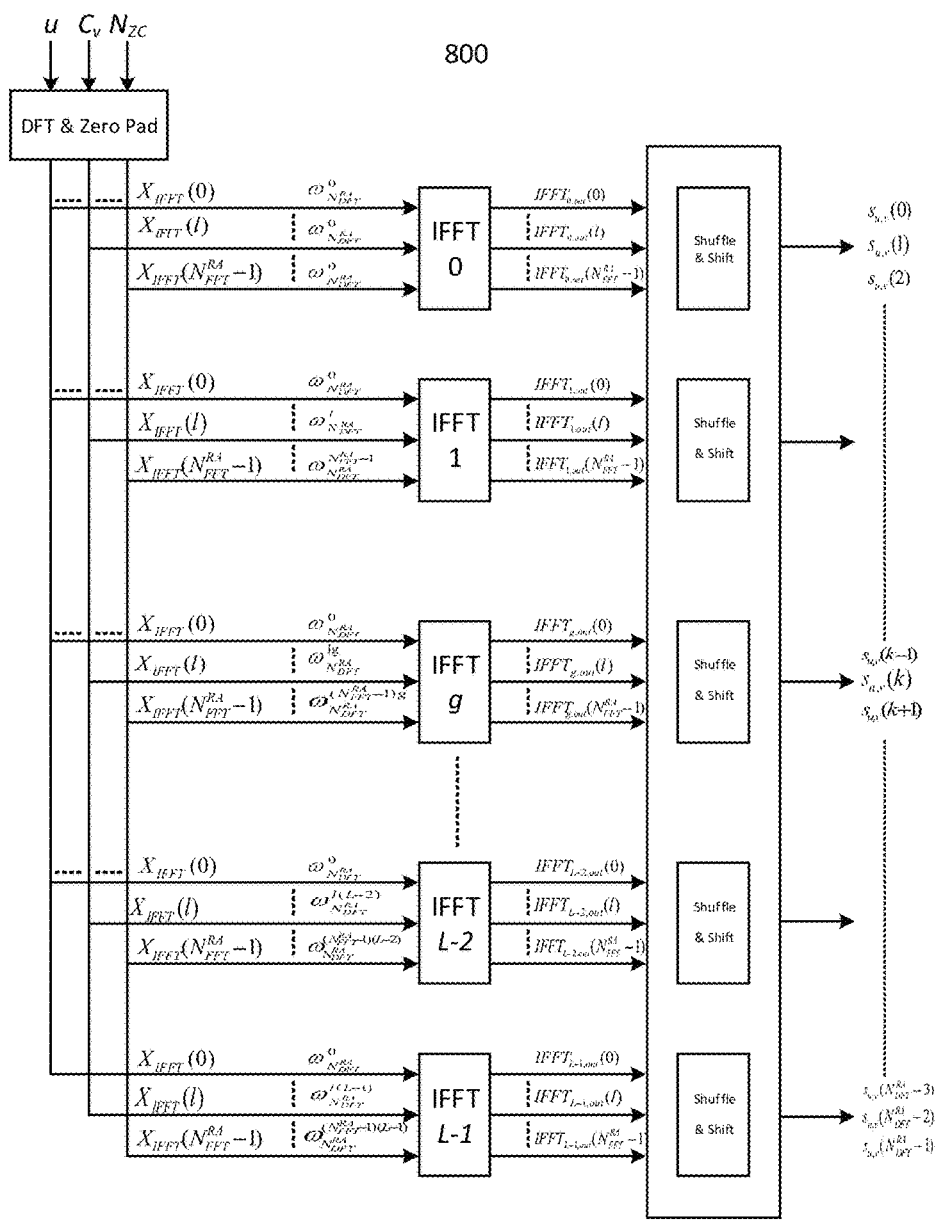
FIG. 8 shows a block diagram illustrating parallel IFFT computation with integrated frequency-shift application.

FIG. 8 shows block diagram 800 further illustrating DFT computation in 604, IDFT decomposition in 606, parallel IFFT computation in 608, and shuffle, merge, and frequency shift in 610. DFT & Zero Pad may receive u, $C_v$, and $N_{ZC}$ and produce $X_{IFFT}(l)$, $0 \leq l \leq N_{FFT}^{RA}-1$, where $X_{IFFT}(N_{ZC}:N_{FFT}^{RA}-1)=0$ per the zero-pad operation. DFT & Zero Pad may thus correspond to the direct DCT computation and IDFT decomposition of 606, although it is appreciated that DFT & Zero Pad may alternatively generate $X_{u,v}(k)$ using a two-part procedure of generating $x_{u,v}(n)$ and performing a DFT operation as opposed to perform direct DCT computation of $X_{u,v}(k)$ from u, $C_v$, and $N_{ZC}$.

As detailed above regarding FIG. 7, each IFFT computation block $IFFT_g$ for $0 \leq g \leq L-1$ may receive $X_{IFFT}(l)$, $0 \leq l \leq N_{FFT}^{RA}-1$, and apply twiddle factor $\omega_{N_{DFT}^{RA}}^{lg}$ to each sample of $X_{IFFT}(l)$. Each IFFT computation block $IFFT_0$–$IFFT_{L-1}$ may then perform an $N_{FFT}^{RA}$-point FFT in order to produce IFFT computation block outputs $IFFT_{g,out}(l)$, where each sample is an (unshifted) sample of $s_{u,v}(m)$ as shown in FIG. 7.

Shuffle & Shift may then receive the $N_{DFT}^{RA}$ total samples (i.e. $N_{FFT}^{RA}$ from each IFFT computation block $IFFT_g$) and shuffle, merge, and frequency-shift the samples in order to obtain $s_{u,v}(m)$ as detailed regarding the Shuffle, Shift, and Merge pseudocode described above. Shuffle & Shift may thus produce the correctly-ordered (in time) and frequency-shifted $s_{u,v}(m)$, $0 \leq m \leq N_{DFT}^{RA}-1$, for use as the baseband preamble sequence in the random access preamble.

Sequence Repetition and Cyclic Prefix Insertion

Baseband modem 206 may obtain $s_{u,v}(m)$ following 610, which may be a digitally-sampled time-domain representation of $X_{u,v}(k)$. In accordance with LTE random access procedures, baseband modem 206 may perform sequence repetition (if needed) and cyclic prefix insertion in 612 and 614, respectively, in order to produce baseband random access preamble s(m) derived from cyclically-shifted root Zadoff-Chu sequence $x_{u,v}(n)$ according to Equation 1. A DAC may then perform digital-to-analog conversion on s(m) to yield analog time-domain baseband random access preamble s(t), which may be provided to RF transceiver 204 for radio frequency modulation and transmission.

Baseband modem 206 may perform sequence repetition dependent on the preamble format on $s_{u,v}(m)$ to produce s'(m). Specifically, baseband modem 206 may repeat $s_{u,v}(m)$ a single time for preamble formats 2 and 3. Baseband modem 206 may not perform any sequence repetition for preamble formats 0, 1, and 4, in which case s'(m)=$s_{u,v}(n)$ Baseband modem 206 may then insert the cyclic prefix in 614. Specifically, baseband modem 206 may copy a certain number of samples from the end of s'(m) and append the copied samples to the beginning of s'(m) as detailed regarding FIG. 5. Baseband modem 206 may select the certain number of samples to copy in accordance with the cyclic prefix duration $T_{CP}$ specified by the preamble format.

Accordingly, baseband modem 206 may produce baseband random access preamble s(m) in 614, where s(m) is derived from the cyclically-shifted root Zadoff-Chu sequence $x_{u,v}(n)$ as detailed above. Baseband modem 206 may then supply s(m) to a DAC, which may perform digital-to-analog conversion on s(m) to produce analog time-domain baseband random access preamble s(t). The DAC may then provide s(t) to RF transceiver 204 following 614. RF transceiver 204 may then modulate s(t) onto a radio carrier frequency and transmit the resulting radio frequency preamble sequence during a selected PRACH opportunity, e.g. a carrier frequency corresponding to a carrier frequency of resource grid 400 and during a PRACH opportunity as shown in resource grid 400.

Mobile terminal 102 may then proceed with random access procedures with base station 110, which may be contention-free in the event that no other mobile terminal selected the same root u-cyclic shift $C_v$ pair as mobile terminal 102 during the selected PRACH opportunity. For example, assuming a contention-free scenario mobile terminal 102 may receive a random access response from base station 110 containing an uplink grant, timing advance (TA), and/or temporary Cell-Radio Network Temporary Identifier (temporary C-RNTI). Mobile terminal 102 may therefore be able to proceed to establish a connection with base station 110 and/or establish timing synchronization with base station 110.

In the event that another mobile terminal, such as e.g. mobile terminal 104, selected the same root u-cyclic shift $C_v$ pair as mobile terminal 102, base station 110 may employ contention resolution to resolve the PRACH conflict.

As previously detailed, mobile terminal 102 may generate baseband random access preamble s(m) in an efficient manner by employing one or more of efficient cyclic shift computation in 602, direct DFT computation in 604, and/or parallel IFFT computation in 606-610 optionally including a concurrent time-domain frequency shift operation. It is appreciated that baseband modem 206 may implement one, some, or all of these procedures in order to improve processing and memory efficiency. Accordingly, while efficiency may be optimized by employing each of efficient cyclic shift computation in 602, direct DFT computation in 604, and parallel IFFT computation in 606-610 including a concurrent time-domain frequency shift operation, mobile terminal 102 may only implement one or some of these procedures and may nevertheless increase the processing and/or memory efficiency of the random access preamble generation procedure. In the event that one or more of the enhanced procedures are not utilized, baseband modem 102 may utilize a corresponding conventional procedure, such e.g. as brute-force cyclic shift computation as opposed to efficient cyclic shift computation (or e.g. another cyclic shift computation), two-part DFT computation as opposed to direct DFT computation (i.e. generation of $x_{u,v}(n)$ and application of a DFT on $x_{u,v}(n)$), and/or conventional serialized IDFT or IFFT computation as opposed to parallel IFFT computation.

Figure 9:
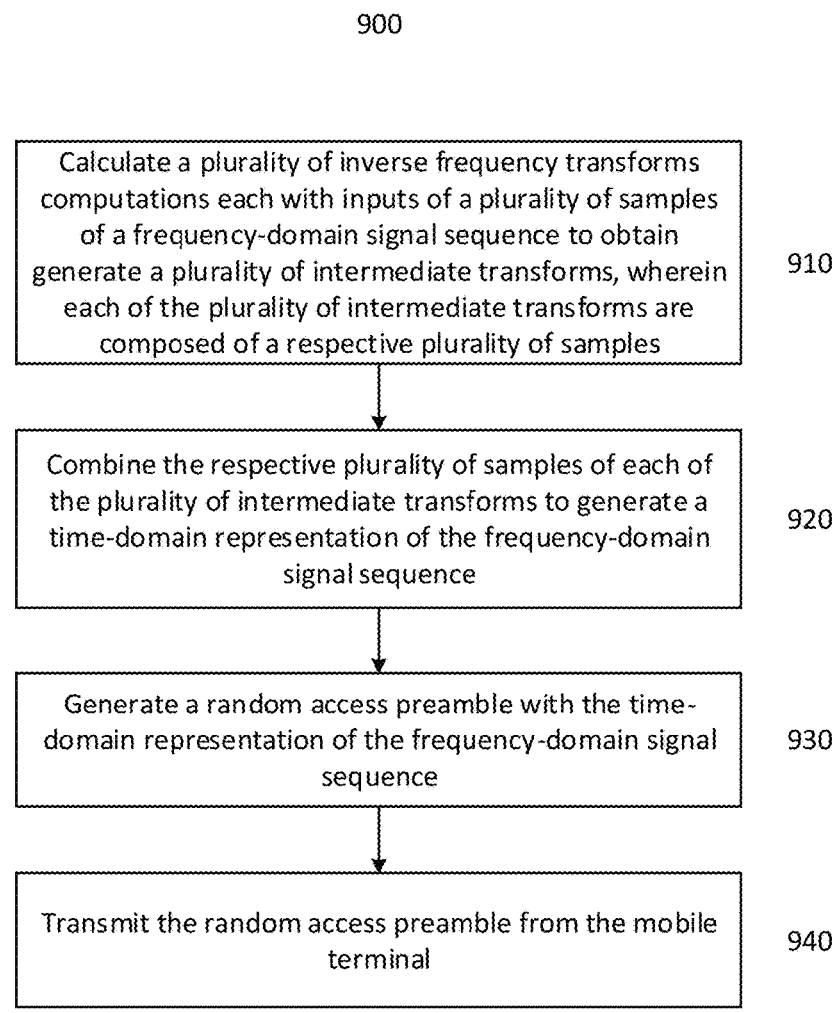
FIG. 9 shows a flow chart illustrating a first method for generating a random access preamble.

FIG. 9 shows method 900 for generating a random access preamble at a mobile terminal. Method 900 includes calculating a plurality of inverse frequency transform to generate a plurality of intermediate transforms in 910, wherein each of the plurality of intermediate transforms are composed of a respective plurality of samples, combining the respective plurality of samples of each of the plurality of intermediate transforms to obtain a time-domain representation of the frequency-domain signal sequence in 920, generating a random access preamble with the time-domain representation of the frequency-domain signal sequence in 930, and transmitting the random access preamble from the mobile terminal in 940.

In one or more further exemplary aspects of the disclosure, one or more of the features described above in reference to FIGS. 1-8 may be further incorporated into method 900. In particular, method 900 may be configured to perform further and/or alternate processes as detailed regarding mobile terminal 102 and/or baseband modem 106.

Figure 10:
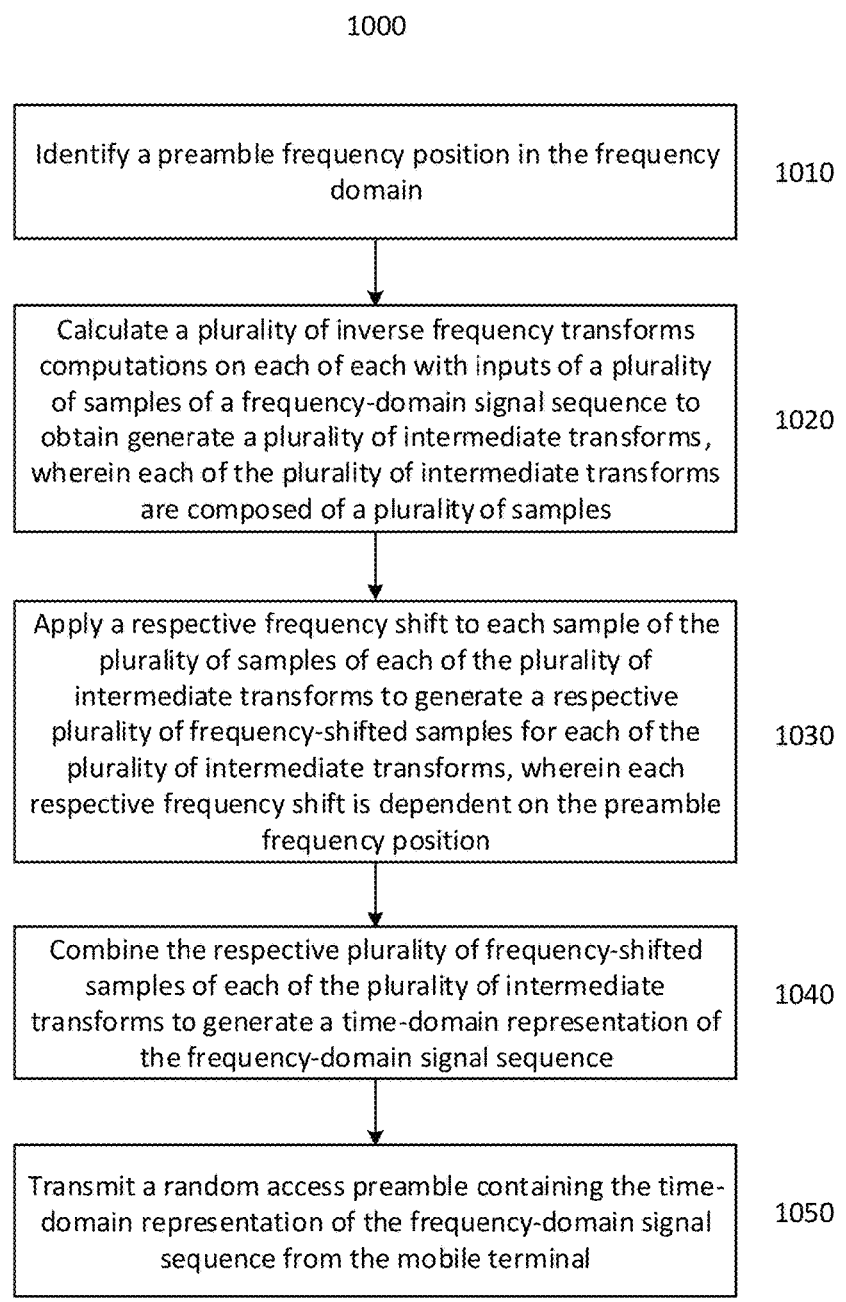
FIG. 10 shows a flow chart illustrating a second method for generating a random access preamble.

FIG. 10 shows method 1000 for generating a random access preamble. Method 1000 may include identifying a preamble frequency position in the frequency domain in 1010, calculating a plurality of inverse frequency transform each with inputs of a plurality of samples of a frequency-domain signal sequence to generate a plurality of intermediate transforms in 1020, wherein each of the plurality of intermediate transforms are composed of a plurality of samples, applying a respective frequency shift to each sample of the plurality of samples of each of the plurality of intermediate transforms to generate a respective plurality of frequency-shifted samples for each of the plurality of intermediate transforms in 1030, wherein each respective frequency shift is dependent on the preamble frequency position, combining the respective plurality of frequency-shifted samples of each of the plurality of intermediate transforms to generate a time-domain representation of the frequency-domain signal sequence in 1040, and transmitting a random access preamble containing the time-domain representation of the frequency-domain signal sequence from the mobile terminal in 1050.

In one or more further exemplary aspects of the disclosure, one or more of the features described above in reference to FIGS. 1-8 may be further incorporated into method 1000. In particular, method 1000 may be configured to perform further and/or alternate processes as detailed regarding mobile terminal 102 and/or baseband modem 106.

It is appreciated that the terms "user equipment", "UE", "mobile terminal", etc., may apply to any wireless communication device, including cellular phones, tablets, laptops, personal computers, and any number of additional electronic devices.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method for generating a random access preamble at a mobile terminal. The method includes calculating a plurality of inverse frequency transforms each with inputs of a plurality of samples of a frequency-domain signal sequence to generate a plurality of intermediate transforms, wherein each of the plurality of intermediate transforms are composed of a respective plurality of samples, combining the respective plurality of samples of each of the plurality of intermediate transforms to generate a time-domain representation of the frequency-domain signal sequence, generating a random access preamble with the time-domain representation of the frequency-domain signal sequence, and transmitting the random access preamble from the mobile terminal.

In Example 2, the subject matter of Example 1 can optionally include wherein the combining the respective plurality of samples of each of the plurality of intermediate transforms to generate a time-domain representation of the frequency domain signal sequence includes applying a respective frequency shift to each of the plurality of samples of each of the plurality of intermediate transforms to generate a plurality of frequency-shifted samples of each of the plurality of intermediate transforms, and combining the plurality of frequency-shifted of samples of each of the plurality of intermediate transforms to generate the time-domain representation of the frequency-domain signal sequence.

In Example 3, the subject matter of Example 2 can optionally further include receiving control signaling indicating a set of frequency resources allocated for random access preamble transmission, and selecting each respective frequency shift to apply to each of the plurality of samples of each of the plurality of intermediate transforms based on the indicated set of frequency resources.

In Example 4, the subject matter of Example 2 can optionally include wherein each respective frequency shift to apply to each of the plurality of samples of each of the plurality of intermediate transforms corresponds to a predetermined preamble sequence frequency shift.

In Example 5, the subject matter of Example 2 can optionally include wherein each respective frequency shift to apply to each of the plurality of samples of each of the plurality of intermediate transforms is dependent on a sample index value of each sample of the respective plurality of samples within each of the plurality of intermediate transforms and a predetermined preamble sequence frequency shift.

In Example 6, the subject matter of Example 5 can optionally further include receiving control signaling indicating the predetermined preamble sequence frequency shift.

In Example 7, the subject matter of any one of Examples 1 to 6 can optionally further include applying a respective frequency shift to each of the plurality of samples of the frequency-domain signal sequence to generate a plurality of frequency-shifted samples of the frequency-domain signal sequence, and providing the plurality of frequency-shifted samples of the frequency-domain signal sequence as input to each of the plurality of inverse frequency transforms.

In Example 8, the subject matter of Example 7 can optionally include wherein each respective frequency shift to apply to each of the plurality of samples of the frequency-domain signal sequence is dependent on a sample index value of each of the plurality of samples of the frequency-domain signal sequence and a computation index of each of the plurality of inverse frequency transforms.

In Example 9, the subject matter of any one of Examples 1 to 8 can optionally include wherein the plurality of inverse frequency transforms are Inverse Fast Fourier Transforms (IFFT).

In Example 10, the subject matter of any one of Examples 1 to 9 can optionally include wherein the calculating a plurality of inverse frequency transforms each with inputs of a plurality of samples of a frequency-domain signal sequence to generate a plurality of intermediate transforms includes calculating the plurality of inverse frequency transforms in parallel to generate the plurality of intermediate transforms.

In Example 11, the subject matter of any one of Examples 1 to 8 can optionally include wherein the plurality of inverse frequency transforms are Inverse Fast Fourier Transforms (IFFT), and wherein the calculating a plurality of inverse frequency transforms each with inputs of a plurality of samples of a frequency-domain signal sequence to generate a plurality of intermediate transforms includes calculating the plurality of IFFTs using a parallel computing architecture to generate the plurality of intermediate transforms.

In Example 12, the subject matter of any one of Examples 1 to 11 can optionally include wherein the combining the respective plurality of samples of each of the plurality of intermediate transforms to generate a time-domain representation of the frequency-domain signal sequence includes rearranging the respective plurality of samples of each of the plurality of intermediate transforms according to a predefined sample order to generate the time-domain representation of the frequency-domain signal sequence.

In Example 13, the subject matter of any one of Examples 1 to 12 can optionally include wherein the transmitting random access preamble sequence is a Physical Random Access Channel (PRACH) preamble.

In Example 14, the subject matter of Example 13 can optionally include wherein transmitting the transmitting the random access preamble from the mobile terminal includes transmitting the random access preamble during a predefined time period.

In Example 15, the subject matter of Example 13 can optionally further include receiving control signaling indicating a time period allocated for PRACH transmissions, and wherein the transmitting the random access preamble during the predefined time period includes transmitting the random access preamble during the time period allocated for PRACH transmission indicated by the control signaling.

In Example 16, the subject matter of Example 13 can optionally include wherein the generating a random access preamble with the time-domain representation of the frequency-domain signal sequence includes attaching a cyclic prefix to the time-domain representation of the frequency-domain signal sequence to generate the random access preamble.

In Example 17, the subject matter of any one of Examples 1 to 16 can optionally further include receiving control signaling indicating a plurality of cyclic shifts and a plurality of sequence root integers.

In Example 18, the subject matter of Example 17 can optionally further include selecting a first cyclic shift from the plurality of cyclic shifts and a first sequence root integer from the plurality of sequence root integers, and generating the frequency-domain signal sequence with the first cyclic shift and the first sequence root integer.

In Example 19, the subject matter of Example 18 can optionally include wherein the frequency-domain signal sequence is a frequency-domain representation of a time-domain signal sequence characterized by the first cyclic shift and the first sequence root integer.

In Example 20, the subject matter of Example 18 can optionally include wherein the frequency-domain signal sequence is a frequency-domain representation of a cyclically-shifted root signal sequence that is cyclically shifted by the first cyclic shift and has the first sequence root integer as a sequence root.

In Example 21, the subject matter of Example 18 can optionally include wherein the frequency-domain signal sequence is a frequency-domain representation of a cyclically-shifted Zadoff-Chu sequence with a cyclic shift of the first cyclic shift and a sequence root of the first sequence root integer.

Example 22 is a mobile terminal device having a radio processing circuit and a baseband processing circuit, wherein the mobile terminal device configured to perform the method of any one of Examples 1 to 21.

Example 23 is a mobile baseband modem including one or more digital processing circuits, the mobile baseband modem configured to perform the method of any one of Examples 1 to 21.

Example 24 is a baseband modem including one or more digital processing circuits, the one or more digital processing circuits configured to calculate a plurality of inverse frequency transforms each with inputs of a plurality of samples of a frequency-domain signal sequence to generate a plurality of intermediate transforms, wherein each of the plurality of intermediate transforms are composed of a respective plurality of samples, combine the respective plurality of samples of each of the plurality of intermediate transforms to generate a time-domain representation of the frequency-domain signal sequence, generate a random access preamble with the time-domain representation of the frequency-domain signal sequence, and transmit the random access preamble.

In Example 25, the subject matter of Example 24 can optionally include wherein the combining the respective plurality of samples of each of the plurality of intermediate transforms to generate a time-domain representation of the frequency domain signal sequence includes applying a respective frequency shift to each of the plurality of samples of each of the plurality of intermediate transforms to generate a plurality of frequency-shifted samples of each of the plurality of intermediate transforms, and combining the plurality of frequency-shifted of samples of each of the plurality of intermediate transforms to generate the time-domain representation of the frequency-domain signal sequence.

In Example 26, the subject matter of Example 25 can optionally include wherein the one or more digital processing circuits are further configured to receive control signaling indicating a set of frequency resources allocated for random access preamble transmission, and select each respective frequency shift to apply to each of the plurality of samples of each of the plurality of intermediate transforms based on the indicated set of frequency resources.

In Example 27, the subject matter of Example 25 can optionally include wherein each respective frequency shift to apply to each of the plurality of samples of each of the plurality of intermediate transforms corresponds to a predetermined preamble sequence frequency shift.

In Example 28, the subject matter of Example 25 can optionally include wherein each respective frequency shift to apply to each of the plurality of samples of each of the plurality of intermediate transforms is dependent on a sample index value of the plurality of samples within the plurality of intermediate transforms and a predetermined preamble sequence frequency shift.

In Example 29, the subject matter of Example 28 can optionally include wherein the one or more digital processing circuits are further configured to receive control signaling indicating the predetermined preamble sequence frequency shift.

In Example 30, the subject matter of any one of Examples 24 to 29 can optionally include wherein the one or more digital processing circuits are further configured to apply a respective frequency shift to each of the plurality of samples of the frequency-domain signal sequence to generate a plurality of frequency-shifted samples of the frequency-domain signal sequence, and provide the plurality of frequency-shifted samples of the frequency-domain signal sequence as input to each of the plurality of inverse frequency transforms.

In Example 31, the subject matter of Example 30 can optionally include wherein each respective frequency shift to apply to each of the plurality of samples of the frequency-domain signal sequence is dependent on a sample index value of each of the plurality of samples of the frequency-domain signal sequence and a computation index of each of the plurality of inverse frequency transforms.

In Example 32, the subject matter of any one of Examples 24 to 31 can optionally include wherein the plurality of inverse frequency transforms are Inverse Fast Fourier Transforms (IFFT).

In Example 33, the subject matter of any one of Examples 24 to 32 can optionally include wherein the calculating a plurality of inverse frequency transforms each with inputs of a plurality of samples of a frequency-domain signal sequence to generate a plurality of intermediate transforms includes calculating the plurality of inverse frequency transforms in parallel to generate the plurality of intermediate transforms.

In Example 34, the subject matter of any one of Examples 24 to 31 can optionally include wherein the plurality of inverse frequency transforms are Inverse Fast Fourier Transforms (IFFT), and wherein the calculating a plurality of inverse frequency transforms each with inputs of a plurality of samples of a frequency-domain signal sequence to generate a plurality of intermediate transforms includes executing the plurality of IFFTs using a parallel computing architecture to generate the plurality of intermediate transforms.

In Example 35, the subject matter of any one of Examples 24 to 31 can optionally include wherein the plurality of inverse frequency transforms are Inverse Fast Fourier Transforms (IFFT), and wherein the one or more digital processing circuits include at least one parallel processing circuit configured to calculate the plurality of IFFTs using a parallel computing architecture to generate the plurality of intermediate transforms.

In Example 36, the subject matter of any one of Examples 24 to 35 can optionally include wherein the combining the respective plurality of samples of each of the plurality of intermediate transforms to generate a time-domain representation of the frequency-domain signal sequence includes rearranging the plurality of samples of each of the plurality of intermediate transforms according to a predefined sample order to generate the time-domain representation of the frequency-domain signal sequence.

In Example 37, the subject matter of any one of Examples 24 to 36 can optionally include wherein the random access preamble is a Physical Random Access Channel (PRACH) sequence.

In Example 38, the subject matter of Example 37 can optionally include wherein the transmitting of the random access preamble includes wirelessly transmitting the random access preamble.

In Example 39, the subject matter of Example 37 can optionally include wherein the one or more digital processing circuits are further configured to receive control signaling indicating a time period allocated for PRACH transmissions, and wherein the transmitting of the random access preamble includes transmitting the random access preamble during the time period allocated for PRACH transmissions indicated by the control signaling.

In Example 40, the subject matter of Example 37 can optionally include wherein the generating a random access preamble with the time-domain representation of the frequency-domain signal includes attaching a cyclic prefix to the time-domain representation of the frequency-domain signal sequence to generate the random access preamble.

In Example 41, the subject matter of any one of Examples 24 to 40 can optionally include wherein the one or more digital processing circuits are further configured to receive control signaling indicating a plurality of cyclic shifts and a plurality of sequence root integers.

In Example 42, the subject matter of Example 41 can optionally include wherein the one or more digital processing circuits are further configured to select a first cyclic shift from the plurality of cyclic shifts and a first sequence root integer from the plurality of sequence root integers, and generate the frequency-domain signal sequence with the first cyclic shift and the first sequence root integer.

In Example 43, the subject matter of Example 42 can optionally include wherein the frequency-domain signal sequence is a frequency-domain representation of a time-domain signal sequence characterized by the first cyclic shift and the first sequence root integer.

In Example 44, the subject matter of Example 42 can optionally include wherein the frequency-domain signal sequence is a frequency-domain representation of a cyclically-shifted root signal sequence that is cyclically shifted by the first cyclic shift and has the first sequence root integer as a sequence root.

In Example 45, the subject matter of Example 42 can optionally include wherein the frequency-domain signal sequence is a frequency-domain representation of a cyclically-shifted Zadoff-Chu sequence with a cyclic shift of the first cyclic shift and a sequence root of the first sequence root integer.

Example 46 is a mobile terminal device including the mobile baseband modem of any one of Examples 24 to 45.

Example 47 is a mobile terminal device having a radio processing circuit and a baseband processing circuit adapted to interact with the baseband processing circuit. The mobile terminal device is configured to calculate a plurality of inverse frequency transforms each with inputs of a plurality of samples of a frequency-domain signal sequence to generate a plurality of intermediate transforms, wherein each of the plurality of intermediate transforms are composed of a respective plurality of samples, combine the respective plurality of samples of each of the plurality of intermediate transforms to generate a time-domain representation of the frequency-domain signal sequence, generate a random access preamble with the time-domain representation of the frequency-domain signal sequence, and transmit the random access preamble.

In Example 48, the subject matter of Example 47 can optionally include wherein the combining the respective plurality of samples of each of the plurality of intermediate transforms to generate a time-domain representation of the frequency-domain signal sequence includes applying a respective frequency shift to each of the plurality of samples of each of the plurality of intermediate transforms to generate a plurality of frequency-shifted samples of each of the plurality of intermediate transforms, and combining the plurality of frequency-shifted of samples of each of the plurality of intermediate transforms to generate the time-domain representation of the frequency-domain signal sequence.

In Example 49, the subject matter of Example 48 can optionally be further configured to receive control signaling indicating a set of frequency resources allocated for random access preamble transmission, and select each respective frequency shift to apply to each of the plurality of samples of each of the plurality of intermediate transforms based on the indicated set of frequency resources.

In Example 50, the subject matter of Example 48 can optionally include wherein each respective frequency shift to apply to each of the plurality of samples of each of the plurality of intermediate transforms corresponds to a predetermined preamble sequence frequency shift.

In Example 51, the subject matter of Example 48 can optionally include wherein each respective frequency shift to apply to each of the plurality of samples of each of the plurality of intermediate transforms is dependent on a sample index value of the plurality of samples within the plurality of intermediate transforms and a predetermined preamble sequence frequency shift.

In Example 52, the subject matter of Example 51 can optionally be further configured to receive control signaling indicating the predetermined preamble sequence frequency shift.

In Example 53, the subject matter of any one of Examples 47 to 52 can optionally be further configured to apply a respective frequency shift to each of the plurality of samples of the frequency-domain signal sequence to generate a plurality of frequency-shifted samples of the frequency-domain signal sequence, and provide the plurality of frequency-shifted samples of the frequency-domain signal sequence as input to each of the plurality of inverse frequency transforms.

In Example 54, the subject matter of Example 53 can optionally include wherein each respective frequency shift to apply to the each of the plurality of samples of the frequency-domain signal sequence are dependent on a sample index value of each of the plurality of samples of the frequency-domain signal sequence and a computation index of each of the plurality of inverse frequency transforms.

In Example 55, the subject matter of any one of Examples 47 to 54 can optionally include wherein the plurality of inverse frequency transforms are Inverse Fast Fourier Transforms (IFFT).

In Example 56, the subject matter of any one of Examples 47 to 55 can optionally include wherein the calculating the plurality of inverse frequency transforms each with inputs of a plurality of samples of a frequency-domain signal sequence to generate a plurality of intermediate transforms includes calculating the plurality of inverse frequency transforms in parallel to generate the plurality of intermediate transforms.

In Example 57, the subject matter of any one of Examples 47 to 54 can optionally include wherein the plurality of inverse frequency transforms are Inverse Fast Fourier Transforms (IFFT), and wherein the calculating a plurality of inverse frequency transforms each with inputs of a plurality of samples of a frequency-domain signal sequence to generate a plurality of intermediate transforms includes calculating the plurality of IFFTs using a parallel computing architecture to generate the plurality of intermediate transforms.

In Example 58, the subject matter of any one of Examples 47 to 54 can optionally include wherein the plurality of inverse frequency transforms are Inverse Fast Fourier Transforms (IFFT), and wherein the baseband processing circuit includes at least one parallel processing circuit configured to calculate the plurality of IFFTs using a parallel computing architecture to generate the plurality of intermediate transforms.

In Example 59, the subject matter of any one of Examples 47 to 58 can optionally include wherein the combining the respective plurality of samples of each of the plurality of intermediate transforms to generate a time-domain representation of the frequency-domain signal sequence includes rearranging the plurality of samples of each of the plurality of intermediate transforms according to a predefined sample order to generate the time-domain representation of the frequency-domain signal sequence.

In Example 60, the subject matter of any one of Examples 47 to 59 can optionally include wherein the random access preamble is a Physical Random Access Channel (PRACH) random access preamble.

In Example 61, the subject matter of Example 60 can optionally include wherein the transmitting the random access preamble includes wirelessly transmitting the random access preamble.

In Example 62, the subject matter of Example 60 can optionally be further configured to receive control signaling indicating a time period allocated for PRACH transmissions, and wherein the transmitting the random access preamble includes transmitting the random access preamble during the time period.

In Example 63, the subject matter of Example 60 can optionally include wherein the generating a random access preamble with the time-domain representation of the frequency-domain signal sequence includes attaching a cyclic prefix to the time-domain representation of the frequency-domain signal sequence to generate the random access preamble.

In Example 64, the subject matter of any one of Examples 47 to 63 can optionally be further configured to receive control signaling indicating a plurality of cyclic shifts and a plurality of sequence root integers.

In Example 65, the subject matter of Example 64 can optionally be further configured to select a first cyclic shift from the plurality of cyclic shifts and a first sequence root integer from the plurality of sequence root integers, and generate the frequency-domain signal sequence with the first cyclic shift and the first sequence root integer.

In Example 66, the subject matter of Example 65 can optionally include wherein the frequency-domain signal sequence is a frequency-domain representation of a time-domain signal sequence characterized by the first cyclic shift and the first sequence root integer.

In Example 67, the subject matter of Example 65 can optionally include the frequency-domain signal sequence is a frequency-domain representation of a cyclically-shifted root signal sequence that is cyclically shifted by the first cyclic shift and has the first sequence root integer as a sequence root.

In Example 68, the subject matter of Example 65 can optionally include wherein the frequency-domain signal sequence is a frequency-domain representation of a cyclically-shifted Zadoff-Chu sequence with a cyclic shift of the first cyclic shift and a sequence root of the first sequence root integer.

Example 69 is a method for generating a random access preamble at a mobile terminal. The method includes identifying a preamble frequency position in the frequency domain, calculating a plurality of inverse frequency transforms each with inputs of a plurality of samples of a frequency-domain signal sequence to generate a plurality of intermediate transforms, wherein each of the plurality of intermediate transforms are composed of a plurality of samples, applying a respective frequency shift to each sample of the plurality of samples of each of the plurality of intermediate transforms to generate a respective plurality of frequency-shifted samples for each of the plurality of intermediate transforms, wherein each respective frequency shift is dependent on the preamble frequency position, combining the respective plurality of frequency-shifted samples of each of the plurality of intermediate transforms to generate a time-domain representation of the frequency-domain signal sequence, and transmitting a random access preamble containing the time-domain representation of the frequency-domain signal sequence from the mobile terminal.

In Example 70, the subject matter of Example 69 can optionally further include generating the random access preamble with the time-domain representation of the frequency-domain signal sequence.

In Example 71, the subject matter of Example 70 can optionally include wherein the transmitting the random access preamble from the mobile terminal includes transmitting the random access preamble during a predefined time period.

In Example 72, the subject matter of Example 70 can optionally include wherein the generating a random access preamble with the time-domain representation of the frequency-domain signal sequence includes attaching a cyclic prefix to the time-domain representation of the frequency-domain signal sequence to generate the random access preamble.

In Example 73, the subject matter of Example 69 can optionally include wherein the identifying a preamble frequency position in the frequency domain includes receiving control signaling indicating a set of frequency resources corresponding to the preamble frequency position that are allocated for random access preamble transmission, and identifying the set of frequency resources as the preamble frequency position.

In Example 74, the subject matter of Example 69 can optionally include wherein each respective frequency shift for each sample of the plurality of samples of each of the plurality of intermediate transforms corresponds to the preamble frequency position.

In Example 75, the subject matter of Example 69 can optionally include wherein each respective frequency shift for each sample of the plurality of samples of each of the plurality of intermediate transforms is dependent on the preamble frequency position and a sample index value of each sample of the plurality of samples within each of the plurality of intermediate transforms.

In Example 76, the subject matter of Example 69 can optionally further include providing each of the plurality of samples of the frequency-domain signal sequence as input to each of the plurality of inverse frequency transforms.

In Example 77, the subject matter of Example 76 can optionally further include applying a respective frequency shift to the each of the plurality of samples of the frequency-domain signal sequence to generate a plurality of frequency-shifted samples of the frequency-domain signal sequence, and providing the plurality of frequency-shifted samples of the frequency-domain signal sequence as input to each of the plurality of inverse frequency transforms.

In Example 78, the subject matter of Example 77 can optionally include wherein each respective frequency shift for each of the plurality of samples of the frequency-domain signal sequence is dependent on a sample index value of each of the plurality of samples of the frequency-domain signal sequence and a computation index of each of the plurality of inverse frequency transforms.

In Example 79, the subject matter of any one of Examples 69 to 78 can optionally include wherein the plurality of inverse frequency transforms are Inverse Fast Fourier Transforms (IFFT).

In Example 80, the subject matter of any one of Examples 69 to 79 can optionally include wherein the calculating a plurality of inverse frequency transforms each with inputs of a plurality of samples of a frequency-domain signal sequence to generate a plurality of intermediate transforms includes calculating the plurality of inverse frequency transforms on each of the plurality of samples of the frequency-domain signal sequence in parallel to generate the plurality of intermediate transforms.

In Example 81, the subject matter of any one of Examples 69 to 78 can optionally include wherein the plurality of inverse frequency transforms are Inverse Fast Fourier Transforms (IFFT), and wherein the calculating a plurality of inverse frequency transforms each with inputs of a plurality of samples of a frequency-domain signal sequence to generate a plurality of intermediate transforms includes calculating the plurality of IFFTs using a parallel computing architecture to generate the plurality of intermediate frequency transforms.

In Example 82, the subject matter of any one of Examples 69 to 81 can optionally include wherein the combining the respective plurality of frequency-shifted samples of each of the plurality of intermediate transforms to generate a time-domain representation of the frequency-domain signal sequence includes rearranging the respective plurality of frequency-shifted samples of each of the plurality of intermediate transforms according to a predefined sample order to generate the time-domain representation of the frequency-domain signal sequence.

In Example 83, the subject matter of any one of Examples 69 to 82 can optionally include wherein the random access preamble is a Physical Random Access Channel (PRACH) preamble, and further including generating the PRACH preamble with the time-domain representation of the frequency-domain signal sequence.

In Example 84, the subject matter of Example 83 can optionally include wherein the transmitting a random access preamble containing the time-domain representation of the frequency-domain signal sequence from the mobile includes wirelessly transmitting the PRACH preamble.

In Example 85, the subject matter of Example 83 can optionally further include receiving control signaling indicating a time period allocated for PRACH transmissions, and wherein the transmitting the random access preamble includes transmitting the PRACH preamble during the time period indicated by the control signaling.

In Example 86, the subject matter of any one of Examples 69 to 85 can optionally further include receiving control signaling indicating a plurality of cyclic shifts and a plurality of root sequence integers.

In Example 87, the subject matter of Example 86 can optionally further include selecting a first cyclic shift from the plurality of cyclic shifts and a first sequence root integer from the plurality of sequence root integers, and generating the frequency-domain signal sequence with the first cyclic shift and the first sequence root integer.

In Example 88, the subject matter of Example 87 can optionally include wherein the frequency-domain signal sequence is a frequency-domain representation of a time-domain signal sequence characterized by the first cyclic shift and the first sequence root integer.

In Example 89, the subject matter of Example 87 can optionally include wherein the frequency-domain signal sequence is a frequency-domain representation of a cyclically-shifted root signal sequence that is cyclically shifted by the first cyclic shift and has the first sequence root integer as a sequence root.

In Example 90, the subject matter of Example 87 can optionally include wherein the frequency-domain signal sequence is a frequency-domain representation of a cyclically-shifted Zadoff-Chu sequence with a cyclic shift of the first cyclic shift and a sequence root of the first sequence root integer.

Example 91 is a mobile terminal device having a radio processing circuit and a baseband processing circuit, the mobile terminal device configured to perform the method of any one of Examples 69 to 21.

Example 92 is a mobile baseband modem including one or more digital processing circuits, the mobile baseband modem configured to perform the method of any one of Examples 69 to 21.

Example 93 is a mobile terminal device having a radio processing circuit and a baseband processing circuit adapted to interact with the radio processing circuit. The mobile terminal device is configured to identify a preamble frequency position in the frequency domain, calculate a plurality of inverse frequency transforms each with inputs of a plurality of samples of a frequency-domain signal sequence to generate a plurality of intermediate transforms, wherein each of the plurality of intermediate transforms are composed of a plurality of samples, apply a respective frequency shift to each sample of the plurality of samples of each of the plurality of intermediate transforms to generate a respective plurality of frequency-shifted samples for each of the plurality of intermediate transforms, wherein each respective frequency shift is dependent on the preamble frequency position, combine the respective plurality of frequency-shifted samples of each of the plurality of intermediate transforms to generate a time-domain representation of the frequency-domain signal sequence, and transmit a random access preamble containing the time-domain representation of the frequency-domain signal sequence.

In Example 94, the subject matter of Example 93 can optionally be further configured to generate the random access preamble with the time-domain representation of the frequency-domain signal sequence.

In Example 95, the subject matter of Example 94 can optionally include wherein the transmitting the random access preamble containing the time-domain representation of the frequency-domain signal sequence includes wirelessly transmitting the random access preamble.

In Example 96, the subject matter of Example 94 can optionally include wherein the generating a random access preamble with the time-domain representation of the frequency-domain signal sequence includes attaching a cyclic prefix to the time-domain representation of the frequency-domain signal sequence to generate the random access preamble.

In Example 97, the subject matter of Example 93 can optionally include wherein the identifying a preamble frequency position in the frequency domain includes receiving control signaling indicating a set of frequency resources corresponding to the preamble frequency position that are allocated for random access preamble transmission, and identifying the set of frequency resources as the preamble frequency position.

In Example 98, the subject matter of Example 93 can optionally include wherein each respective frequency shift for each sample of the plurality of samples of each of the plurality of intermediate transforms corresponds to the preamble frequency position.

In Example 99, the subject matter of Example 93 can optionally include wherein each respective frequency shift for each sample of the plurality of samples of each of the plurality of intermediate transforms is dependent on the preamble frequency position and a sample index value of each sample of the plurality of samples within each of the plurality of intermediate transforms.

In Example 100, the subject matter of Example 93 can optionally be further configured to provide each of the plurality of samples of the frequency-domain signal sequence as input to each of the plurality of inverse frequency transforms.

In Example 101, the subject matter of Example 100 can optionally be further configured to apply a respective frequency shift to the each of the plurality of samples of the frequency-domain signal sequence to generate a plurality of frequency-shifted samples of the frequency-domain signal sequence, and provide the plurality of frequency-shifted samples of the frequency-domain signal sequence as input to each of the plurality of inverse frequency transforms.

In Example 102, the subject matter of Example 101 can optionally include wherein each respective frequency shift for each of the plurality of samples of the frequency-domain signal sequence is dependent on a sample index value of each of the plurality of samples of the frequency-domain signal sequence and a computation index of each of the plurality of inverse frequency transforms.

In Example 103, the subject matter of any one of Examples 93 to 102 can optionally include wherein the plurality of inverse frequency transforms are Inverse Fast Fourier Transforms (IFFT).

In Example 104, the subject matter of any one of Examples 93 to 103 can optionally include wherein the calculating a plurality of inverse frequency transforms each with inputs of a plurality of samples of a frequency-domain signal sequence to generate a plurality of intermediate transforms includes calculating the plurality of inverse frequency transforms on each of the plurality of samples of the frequency-domain signal sequence in parallel to generate a plurality of intermediate transforms.

In Example 105, the subject matter of any one of Examples 93 to 102 can optionally include wherein the plurality of inverse frequency transforms are Inverse Fast Fourier Transforms (IFFT), and wherein the calculating a plurality of inverse frequency transforms each with inputs of a plurality of samples of a frequency-domain signal sequence to generate a plurality of intermediate transforms includes calculating the plurality of IFFTs using a parallel computing architecture to generate the plurality of intermediate frequency transforms.

In Example 106, the subject matter of any one of Examples 93 to 105 can optionally include wherein the combining the respective plurality of frequency-shifted samples of each of the plurality of intermediate transforms to generate a time-domain representation of the frequency-domain signal sequence includes rearranging the respective plurality of frequency-shifted samples of each of the plurality of intermediate transforms according to a predefined sample order to generate the time-domain representation of the frequency-domain signal sequence.

In Example 107, the subject matter of any one of Examples 93 to 106 can optionally include wherein the random access preamble is a Physical Random Access Channel (PRACH) preamble, and wherein the mobile terminal device is further configured to generate the PRACH preamble with the time-domain representation of the frequency-domain signal sequence.

In Example 108, the subject matter of Example 107 can optionally include wherein the transmitting a random access preamble containing the time-domain representation of the frequency-domain signal sequence from the mobile terminal includes wirelessly transmitting the PRACH preamble In Example 109, the subject matter of Example 107 can optionally be further configured to receive control signaling indicating a time period allocated for PRACH transmissions, and wherein the transmitting the random access preamble includes transmitting the PRACH preamble during the time period.

In Example 110, the subject matter of any one of Examples 93 to 105 can optionally be further configured to receive control signaling indicating a plurality of cyclic shifts and a plurality of root sequence integers.

In Example 111, the subject matter of Example 110 can optionally be further configured to select a first cyclic shift from the plurality of cyclic shifts and a first sequence root integer from the plurality of sequence root integers, and generate the frequency-domain signal sequence with the first cyclic shift and the first sequence root integer.

In Example 112, the subject matter of Example 111 can optionally include wherein the frequency-domain signal sequence is a frequency-domain representation of a time-domain signal sequence characterized by the first cyclic shift and the first sequence root integer.

In Example 113, the subject matter of Example 111 can optionally include wherein the frequency-domain signal sequence is a frequency-domain representation of a cyclically-shifted root signal sequence that is cyclically shifted by the first cyclic shift and has the first sequence root integer as a sequence root.

In Example 114, the subject matter of Example 111 can optionally include wherein the frequency-domain signal sequence is a frequency-domain representation of a cyclically-shifted Zadoff-Chu sequence with a cyclic shift of the first cyclic shift and a sequence root of the first sequence root integer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device having a radio processing circuit and a baseband processing circuit adapted to interact with the baseband processing circuit, the mobile terminal device configured to:
   calculate a plurality of inverse frequency transforms each with inputs of a plurality of samples of a frequency-domain signal sequence to generate a plurality of intermediate transforms, wherein each of the plurality of intermediate transforms are composed of a respective plurality of samples;
   combine the respective plurality of samples of each of the plurality of intermediate transforms to generate a time-domain representation of the frequency-domain signal sequence, wherein the combining comprises reordering the respective plurality of samples of each of the plurality of intermediate transforms to generate reordered samples that are a time-domain transform of the frequency-domain signal sequence that was input into one of the plurality of inverse frequency transforms;
   generate a random access preamble with the time-domain representation of the frequency-domain signal sequence; and
   transmit the random access preamble.

2. The mobile terminal device of claim 1, wherein the time-domain transform of the frequency-domain signal sequence is one of a plurality of predefined random access sequences for a wireless communication standard.

3. A method for generating a random access preamble at a mobile terminal, the method comprising:
   calculating a plurality of inverse frequency transforms each with inputs of a plurality of samples of a frequency-domain signal sequence to generate a plurality of intermediate transforms, wherein each of the plurality of intermediate transforms are composed of a respective plurality of samples;
   combining the respective plurality of samples of each of the plurality of intermediate transforms to generate a time-domain representation of the frequency-domain signal sequence, wherein the combining the respective plurality of samples of each of the plurality of intermediate transforms to generate a time-domain representation of the frequency-domain signal sequence comprises rearranging the respective plurality of samples of each of the plurality of intermediate transforms according to a predefined sample order to generate the time-domain representation of the frequency-domain signal sequence;
   generating a random access preamble with the time-domain representation of the frequency-domain signal sequence; and
   transmitting the random access preamble from the mobile terminal.

4. The method of claim 3, wherein the combining the respective plurality of samples of each of the plurality of intermediate transforms to generate a time-domain representation of the frequency domain signal sequence comprises:
   applying a respective frequency shift to each of the plurality of samples of each of the plurality of intermediate transforms to generate a plurality of frequency-shifted samples of each of the plurality of intermediate transforms; and
   combining the plurality of frequency-shifted of samples of each of the plurality of intermediate transforms to generate the time-domain representation of the frequency-domain signal sequence.

5. The method of claim 4, wherein each respective frequency shift to apply to each of the plurality of samples of each of the plurality of intermediate transforms is dependent on a sample index value of each sample of the respective plurality of samples within each of the plurality of intermediate transforms and a predetermined preamble sequence frequency shift.

6. The method of claim 3, further comprising:
   applying a respective frequency shift to each of the plurality of samples of the frequency-domain signal sequence to generate a plurality of frequency-shifted samples of the frequency-domain signal sequence; and
   providing the plurality of frequency-shifted samples of the frequency-domain signal sequence as input to each of the plurality of inverse frequency transforms.

7. The method of claim 6, wherein each respective frequency shift to apply to each of the plurality of samples of the frequency-domain signal sequence is dependent on a sample index value of each of the plurality of samples of the frequency-domain signal sequence and a computation index of each of the plurality of inverse frequency transforms.

8. The method of claim 3, wherein the plurality of inverse frequency transforms are Inverse Fast Fourier Transforms (IFFT).

9. The method of claim 3, wherein the calculating a plurality of inverse frequency transforms each with inputs of a plurality of samples of a frequency-domain signal sequence to generate a plurality of intermediate transforms comprises:
  calculating the plurality of inverse frequency transforms in parallel to generate the plurality of intermediate transforms.

10. The method of claim 3, wherein the plurality of inverse frequency transforms are Inverse Fast Fourier Transforms (IFFT),
  and wherein the calculating a plurality of inverse frequency transforms each with inputs of a plurality of samples of a frequency-domain signal sequence to generate a plurality of intermediate transforms comprises:
  calculating the plurality of IFFTs using a parallel computing architecture to generate the plurality of intermediate transforms.

11. The method of claim 3, wherein the transmitting random access preamble sequence is a Physical Random Access Channel (PRACH) preamble.

12. The method of claim 11, wherein transmitting the transmitting the random access preamble from the mobile terminal comprises transmitting the random access preamble during a predefined time period.

13. A mobile terminal device having a radio processing circuit and a baseband processing circuit adapted to interact with the baseband processing circuit, the mobile terminal device configured to:
  calculate a plurality of inverse frequency transforms each with inputs of a plurality of samples of a frequency-domain signal sequence to generate a plurality of intermediate transforms, wherein each of the plurality of intermediate transforms are composed of a respective plurality of samples;
  combine the respective plurality of samples of each of the plurality of intermediate transforms to generate a time-domain representation of the frequency-domain signal sequence, wherein the combining the respective plurality of samples of each of the plurality of intermediate transforms to generate a time-domain representation of the frequency-domain signal sequence comprises rearranging the plurality of samples of each of the plurality of intermediate transforms according to a predefined sample order to generate the time-domain representation of the frequency-domain signal sequence;
  generate a random access preamble with the time-domain representation of the frequency-domain signal sequence; and
  transmit the random access preamble.

14. The mobile terminal device of claim 13, wherein the combining the respective plurality of samples of each of the plurality of intermediate transforms to generate a time-domain representation of the frequency-domain signal sequence comprises:
  applying a respective frequency shift to each of the plurality of samples of each of the plurality of intermediate transforms to generate a plurality of frequency-shifted samples of each of the plurality of intermediate transforms; and
  combining the plurality of frequency-shifted of samples of each of the plurality of intermediate transforms to generate the time-domain representation of the frequency-domain signal sequence.

15. The mobile terminal device of claim 14, further configured to:
  receive control signaling indicating a set of frequency resources allocated for random access preamble transmission; and
  select each respective frequency shift to apply to each of the plurality of samples of each of the plurality of intermediate transforms based on the indicated set of frequency resources.

16. The mobile terminal device of claim 14, wherein each respective frequency shift to apply to each of the plurality of samples of each of the plurality of intermediate transforms corresponds to a predetermined preamble sequence frequency shift.

17. The mobile terminal device of claim 14, wherein each respective frequency shift to apply to each of the plurality of samples of each of the plurality of intermediate transforms is dependent on a sample index value of the plurality of samples within the plurality of intermediate transforms and a predetermined preamble sequence frequency shift.

18. The mobile terminal device of claim 13, further configured to:
  apply a respective frequency shift to each of the plurality of samples of the frequency-domain signal sequence to generate a plurality of frequency-shifted samples of the frequency-domain signal sequence; and
  provide the plurality of frequency-shifted samples of the frequency-domain signal sequence as input to each of the plurality of inverse frequency transforms.

19. The mobile terminal device of claim 18, wherein each respective frequency shift to apply to the each of the plurality of samples of the frequency-domain signal sequence are dependent on a sample index value of each of the plurality of samples of the frequency-domain signal sequence and a computation index of each of the plurality of inverse frequency transforms.

20. The mobile terminal device of claim 13, wherein the plurality of inverse frequency transforms are Inverse Fast Fourier Transforms (IFFT).

21. The mobile terminal device of claim 13, wherein the calculating the plurality of inverse frequency transforms each with inputs of a plurality of samples of a frequency-domain signal sequence to generate a plurality of intermediate transforms comprises:
  calculating the plurality of inverse frequency transforms in parallel to generate the plurality of intermediate transforms.

22. The mobile terminal device of claim 13, wherein the plurality of inverse frequency transforms are Inverse Fast Fourier Transforms (IFFT),
  and wherein the calculating a plurality of inverse frequency transforms each with inputs of a plurality of samples of a frequency-domain signal sequence to generate a plurality of intermediate transforms comprises:
  calculating the plurality of IFFTs using a parallel computing architecture to generate the plurality of intermediate transforms.

23. The mobile terminal device of claim 13, wherein the generating a random access preamble with the time-domain representation of the frequency-domain signal sequence comprises attaching a cyclic prefix to the time-domain representation of the frequency-domain signal sequence to generate the random access preamble.

24. The mobile terminal device of claim 13, wherein transmitting the transmitting the random access preamble from the mobile terminal includes transmitting the random access preamble during a predefined time period.

* * * * *